United States Patent
Richards

(10) Patent No.: US 8,711,168 B2
(45) Date of Patent: Apr. 29, 2014

(54) DIGITAL DISPLAY DEVICES AND DIGITAL PROJECTORS WITH EXPANDED COLOR GAMUT

(75) Inventor: Martin Richards, Redwood, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 131 days.

(21) Appl. No.: 13/377,539

(22) PCT Filed: Jul. 26, 2010

(86) PCT No.: PCT/US2010/043277
§ 371 (c)(1),
(2), (4) Date: Dec. 10, 2011

(87) PCT Pub. No.: WO2011/017062
PCT Pub. Date: Feb. 10, 2011

(65) Prior Publication Data
US 2012/0127194 A1 May 24, 2012

Related U.S. Application Data

(60) Provisional application No. 61/271,901, filed on Jul. 27, 2009.

(51) Int. Cl.
| | |
|---|---|
| G09G 5/00 | (2006.01) |
| G09G 5/02 | (2006.01) |
| G09G 5/10 | (2006.01) |
| G09G 3/30 | (2006.01) |
| H04N 5/202 | (2006.01) |
| H04N 3/14 | (2006.01) |
| H04N 5/46 | (2006.01) |
| H04N 5/57 | (2006.01) |
| G02F 1/1335 | (2006.01) |
| H04N 1/46 | (2006.01) |
| G03B 21/56 | (2006.01) |
| G06K 9/40 | (2006.01) |
| G06T 11/00 | (2006.01) |
| G06T 5/00 | (2006.01) |
| G03F 3/08 | (2006.01) |
| G02F 1/00 | (2006.01) |
| G02F 1/33 | (2006.01) |
| G06K 9/00 | (2006.01) |
| G06K 9/36 | (2006.01) |

(52) U.S. Cl.
CPC ............... G09G 5/02 (2013.01); G06T 11/001 (2013.01); G06T 5/001 (2013.01); H04N 5/57 (2013.01)
USPC ........... 345/590; 345/581; 345/600; 345/606; 345/77; 345/690; 348/254; 348/273; 348/557; 348/687; 349/106; 358/512; 358/516; 358/518; 359/237; 359/308; 359/443; 382/254; 382/260; 382/274; 382/167

(58) Field of Classification Search
USPC ......... 345/581, 589, 590–591, 593–594, 597, 345/600, 606, 611, 617–619, 629, 643, 22, 345/48, 63, 77, 204, 690, 694; 348/68–71, 348/223.1, 254–258, 268–273, 383, 514, 348/557, 560, 577, 602, 687, 708, 739, 348/742–744, 759–761, 807–808; 349/1, 5, 349/7, 104, 106–109; 358/1.9, 509, 510, 358/512, 515, 516, 518–520, 525, 358/447–448; 359/237, 242, 308, 443; 382/162, 167, 254, 274, 276, 260
See application file for complete search history.

(56) References Cited

U.S. PATENT DOCUMENTS

| | | |
|---|---|---|
| 6,280,034 B1 | 8/2001 | Brennesholtz |
| 6,698,890 B1 | 3/2004 | Jorke |
| 6,753,829 B2 | 6/2004 | Ouchi |
| 7,001,021 B2 | 2/2006 | Jorke |
| 7,959,295 B2 | 6/2011 | Richards |
| 2003/0234911 A1 * | 12/2003 | Horvath et al. ............... 353/31 |
| 2004/0184005 A1 | 9/2004 | Roth |
| 2005/0225630 A1 | 10/2005 | Childers |
| 2007/0085789 A1 | 4/2007 | De Vaan |
| 2007/0132953 A1 | 6/2007 | Silverstein |
| 2007/0188711 A1 * | 8/2007 | Sharp et al. ............... 353/8 |
| 2007/0247709 A1 | 10/2007 | Karakawa |

| | | |
|---|---|---|
| 2007/0273848 | A1 | 11/2007 Fan |
| 2008/0278574 | A1 | 11/2008 Ramstad |
| 2008/0297530 | A1* | 12/2008 Ramstad ............ 345/589 |

FOREIGN PATENT DOCUMENTS

| | | |
|---|---|---|
| EP | 1947866 | 7/2008 |
| WO | 02101644 | 12/2002 |
| WO | 2006/102769 | 10/2006 |
| WO | 2006109271 | 10/2006 |
| WO | 2008076104 | 6/2008 |
| WO | 2008091611 | 7/2008 |
| WO | 2009004562 | 1/2009 |

OTHER PUBLICATIONS

Katoh, N., et al., "Three-Dimensional Gamut Mapping Using Various Color Difference Formulae and Color Spaces" Journal of Electronic Imaging, SPIE, vol. 8, No. 4, Oct. 1, 1999, pp. 365-378.

Silverstein, L, et al., "Hybrid Spatial-Temporal Color Synthesis and its Applications" SID Journals, vol. 14, No. 1, Jan. 2006, pp. 3-13.

* cited by examiner

*Primary Examiner* — Wesner Sajous

(57) ABSTRACT

The color gamut of display devices like digital projectors and digital displays is expanded by incorporating additional pass-band filters into the optical path of the devices to produce presentations of color components in two different color gamuts. The composite visual effect of the two presentations is a presentation in an expanded color gamut. Special considerations in the modulation of color components of the image can reduce variations in color and brightness, which can otherwise manifest themselves as flicker.

27 Claims, 13 Drawing Sheets

DIGITAL DISPLAY DEVICES AND DIGITAL PROJECTORS WITH EXPANDED COLOR GAMUT

CROSS-REFERENCE TO RELATED APPLICATIONS

This application claims priority to U.S. Patent Provisional Application No. 61/271,901 filed 27 Jul. 2009, hereby incorporated by reference in its entirety.

TECHNICAL FIELD

The present invention pertains generally to the display and projection of color images and pertains more specifically to expanding the size of the color gamut in which devices may generate color components of color images for presentation and to improving the perceived quality of the image that is displayed within the expanded color gamut.

BACKGROUND ART

Digital projectors and digital displays present color images by generating light in distinct portions or subbands of the visible-light spectrum. Typically three subbands are used that include a primary color such as, for example, the colors red, green and blue.

The range of colors that can be presented by a device can be represented by a portion of a multidimensional color space and this portion of color space is often referred to as the color gamut of the device. The human visual system is able to discern a broader range of colors than can be presented by projectors and displays and various techniques have been tried to expand the color gamut of projectors and displays. Although some techniques have succeeded in expanding the gamut of a projector or display, no technique has been completely satisfactory because it introduces one or more disadvantages. The disadvantages include significant increases in device manufacturing costs, significant reductions in device efficiency, less than optimum renditions of certain colors, and annoying artifacts such as flicker or metameric failure.

DISCLOSURE OF INVENTION

It is an object of the present invention to provide for an increase in size of the color gamut for images presented by digital projectors and digital displays while avoiding or at least reducing the disadvantages introduced by other techniques. This object is achieved by the present invention as set forth in this disclosure.

The various aspects of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

The present invention is applicable to projectors and displays that present color images. Various aspects pertinent to projectors are discussed first, followed by a discussion of aspects that are pertinent to displays.

A. Projector

1. Overview of a Projector

Figure 1:
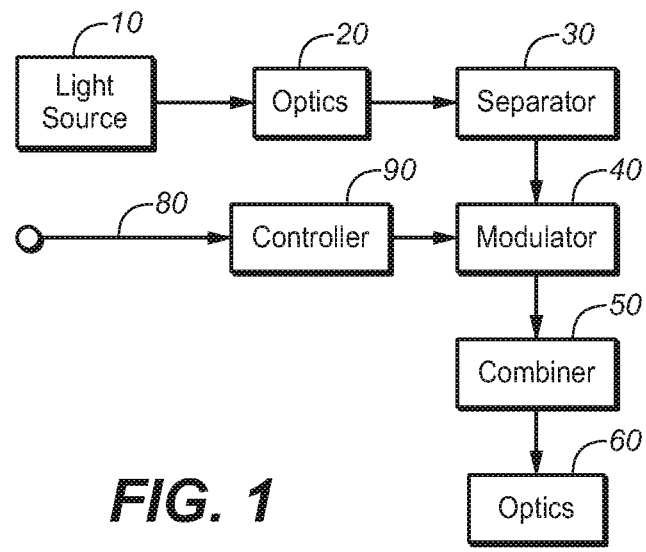
FIG. 1 is a schematic block diagram of a digital projector.

FIG. 1 is a schematic block diagram of a digital projector that can incorporate various aspects of the present invention. This block diagram as well as all other block diagrams referred to in this disclosure omits features that can be important to practical implementations but are not needed to discuss the present invention. Examples of omitted features include components like infrared (IR) and ultraviolet (UV) filters, cooling systems and power supplies. Referring to FIG. 1, a light source 10 generates a beam of light that is collected and concentrated by the optics 20. The separator 30 receives the light beam from the optics 20, splits the light beam into three or more subbands of the visible light spectrum, and passes the light in these subbands to the modulator 40. The modulator 40 receives a control signal from the controller 90 and modulates the light in each subband in response to that control signal to generate modulated color components of the image to be presented. The modulated color components in the three or more subbands are passed to the combiner 50, which combines them into a single beam and projects them through the optics 60 onto some suitable surface such as a projection screen.

The controller 90 generates the control signal in response to an input signal received from the path 80. In some implementations, the input signal represents the image to be presented and the controller 90 derives the modulation control signals needed to present that image using principles and techniques like those discussed below. Many alternatives are possible. In one alternative, the input signal represents the modulation levels that are needed to present the image and the controller 90 merely controls the timing of the delivery of these signals to the modulator 40.

The components illustrated in FIG. 1 may be implemented in a variety of ways. The light source 10 may be implemented by a single lamp such as a Xenon arc lamp or incandescent lamp with a rear reflector that reflects only wavelengths above IR and a front filter that blocks UV light. The optics 20 may include a an optical rod or light pipe and relay optics that produces a uniform rectangular light pattern and focuses the light received from the light source 10 onto an input port of the separator 30. The separator 30 may be implemented by a set of wavelength-selective mirrors, filters or reflective surfaces on prisms. The wavelength-selective mirrors, filters and reflective surfaces of prisms may be constructed using interference filters or so-called dichroic filters. The modulator 40 may be implemented by one or more transmissive devices such as liquid-crystal display (LCD) panels, or one or more reflective devices such as digital micro-mirror devices (DMD) and liquid-crystal on silicon (LCOS) devices. The combiner 50 may be implemented by a set of minors, a prism or a lens system. The separator 30 and the combiner 50 may also be implemented by a single component such as a so-called trichoic prism or Philips prism. The optics 60 may be implemented by a separate lens system or it may be integrated with the combiner 50. If desired, the light source 10 and the separator 30 may be replaced by a plurality of light sources that generate light in the respective subbands. No particular implementation is essential to practice the present invention.

The various implementations of projectors may be categorized as using either parallel modulation or sequential modulation. Parallel-modulation implementations use multiple light sources or wavelength-selective minors, filters, or reflective surfaces on prisms to obtain concurrent subband light beams and use a distinct modulator 40 for each subband. The parallel-modulation implementations can present the modulated color components in all subbands simultaneously. Sequential-modulation implementations use wavelength-selective filters such as a rotating optical wheel, for example, to split a light beam into an alternating sequence of subband light beams that can be modulated by a single modulator 40. The sequential-modulation implementations present intervals of the modulated color components in the subbands in an alternating sequence. Many practical implementations present the alternating sequence at a rate of 120 Hz or more.

An exemplary implementation of a digital projector that is discussed below is similar to many current implementations of professional digital-cinema or so called D-cinema projectors. In this implementation, the light source 10 comprises a Xenon arc lamp and a reflector. The optics 20 comprises a lens and an integrating rod. An optical filter wheel that implements two optical filters discussed below is installed between this lens and the integrating rod. The separator 30 is implemented by a set of prisms with dichroic reflective surfaces that split light into three subband beams. The modulator 40 comprises a separate DMD for each subband beam. The combiner 50 is also implemented by the set of prisms that implement the separator 30. The optics 60 comprises a projection lens system.

2. Reference Color Gamut

Figure 2A:
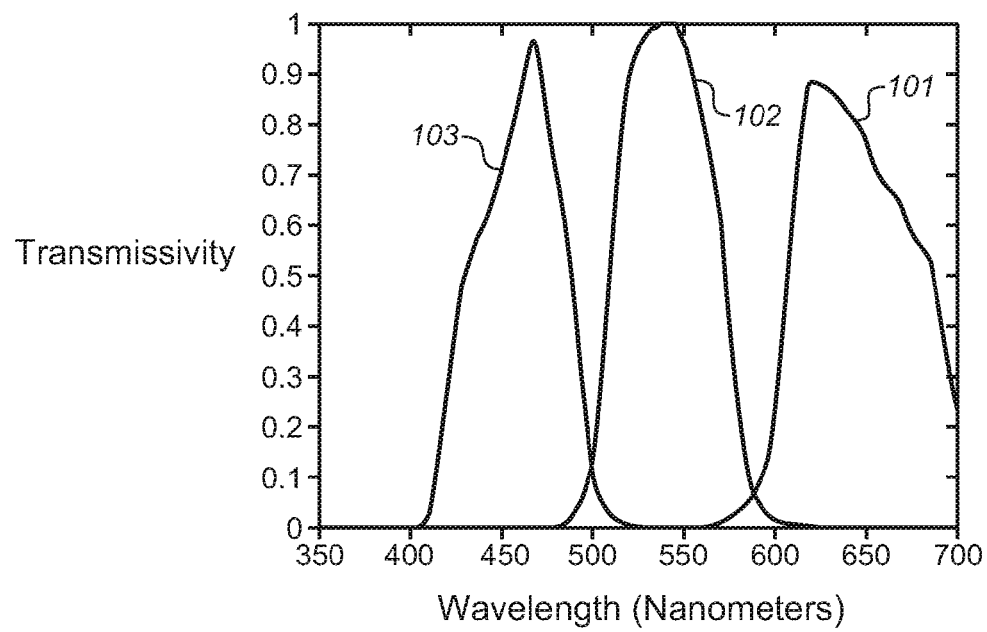
FIG. 2A is a graphical illustration of the wavelengths included in three subbands of the exemplary projector.

FIG. 2A is a graphical illustration of the spectral power density of light included in each of three subbands for the exemplary projector. These subbands conform to the P3 color space of digital cinema projectors as described in the proposed Engineering Guideline for Digital Cinema, SMPTE 432-1, published by the Society of Motion Picture and Television Engineers. The light in the subbands 101, 102 and 103 is perceived as being red, green and blue in color, respectively.

Figure 2B:
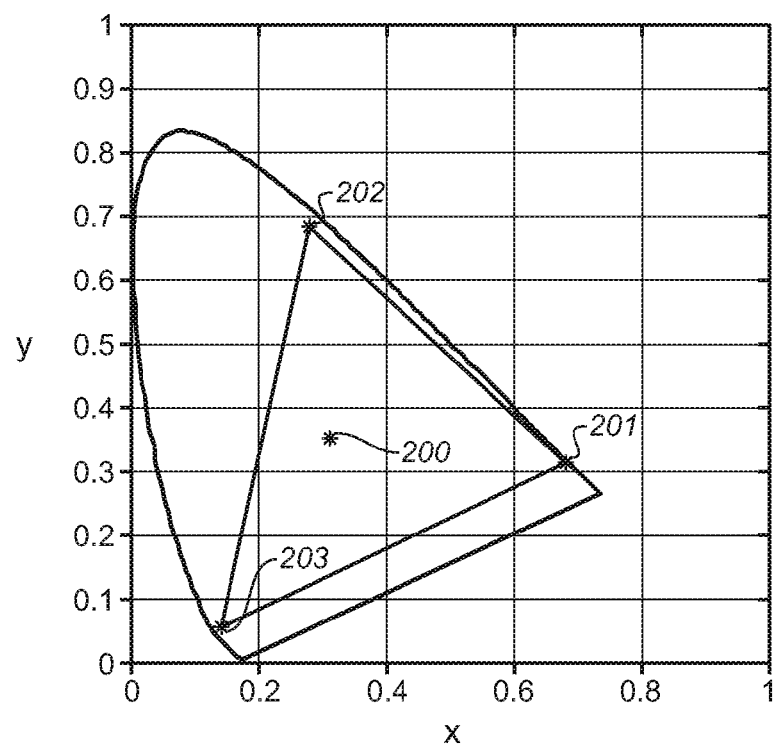
FIG. 2B is a CIE 1931 color space chromaticity diagram showing the reference color gamut of the exemplary projector.

FIG. 2B is a CIE 1931 color space chromaticity diagram. The area within the horse-shoe shaped curve that is closed at the bottom represents the range of colors that can be discerned by a typical human observer. The triangle within the horse-shoe shaped curve defines the range of colors, or the color gamut, that can be presented by the exemplary projector using light subbands with the range of wavelengths depicted in FIG. 2A. The corners 201, 202 and 203 of the color gamut represent the most extreme red, green and blue colors that the exemplary projector can present, respectively. The point 200 represents the white point of this color gamut.

The color gamut of a projector can be expanded by practicing various aspects of the present invention. The unexpanded gamut of a projector, represented by the triangle shown in FIG. 2B, is referred to as the "reference color gamut" of the projector.

3. Expanded Color Gamut

The reference color gamut can be expanded for projectors using parallel modulation and sequential modulation. This may be done by designing two optical filters according to teachings of the present invention and incorporating these two optical filters anywhere along the optical path of the projector from the light source 10 to the optics 60. This may be done in a parallel or sequential manner. A parallel implementation increases the number of parallel optical paths with modulators to accommodate all combinations of original subbands and passbands of the first and second optical filters. Sequential implementations incorporate alternate applications of the first and second optical filters in each optical path.

In the exemplary implementation, the optical filters are implemented sequentially by interference filters or dichroic filters in an optical filter wheel installed within the optics 20 at a point where the light beam is focused to a relatively small area. In many implementations including the exemplary implementation, this point is between a collimating lens and an optical bar or a light pipe that carries the light to the separator 30.

If the two optical filters are implemented sequentially such as by a rotating wheel, the rate of sequential application should be sufficiently high to avoid generating visible flicker for most human observers. A rate of 120 Hz or higher is generally acceptable.

Figure 3A:
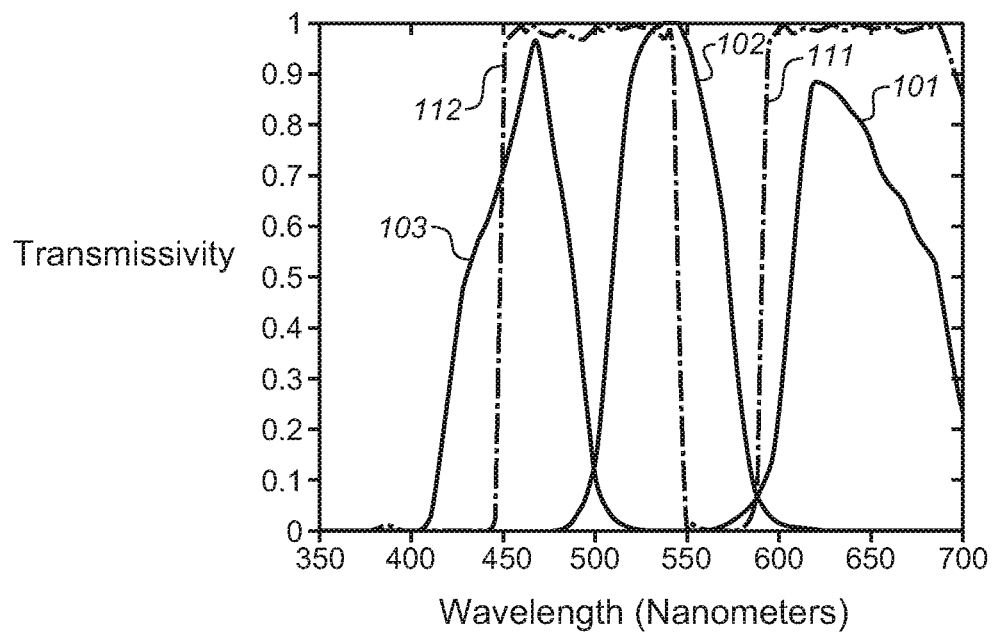
FIG. 3A is a graphical illustration of the wavelengths included in the three subbands and in the passbands of a first optical filter for the exemplary projector.

FIG. 3A is a graphical illustration of the wavelengths included in the three subbands and in each passband of the first of the two optical filters for the exemplary projector mentioned above. The figure illustrates the normalized transmissivity of each passband 111, 112 in the first optical filter. Each passband overlaps at least a portion of the wavelengths in at least one of the subband light beams but does not include all wavelengths in all subbands.

Figure 3B:
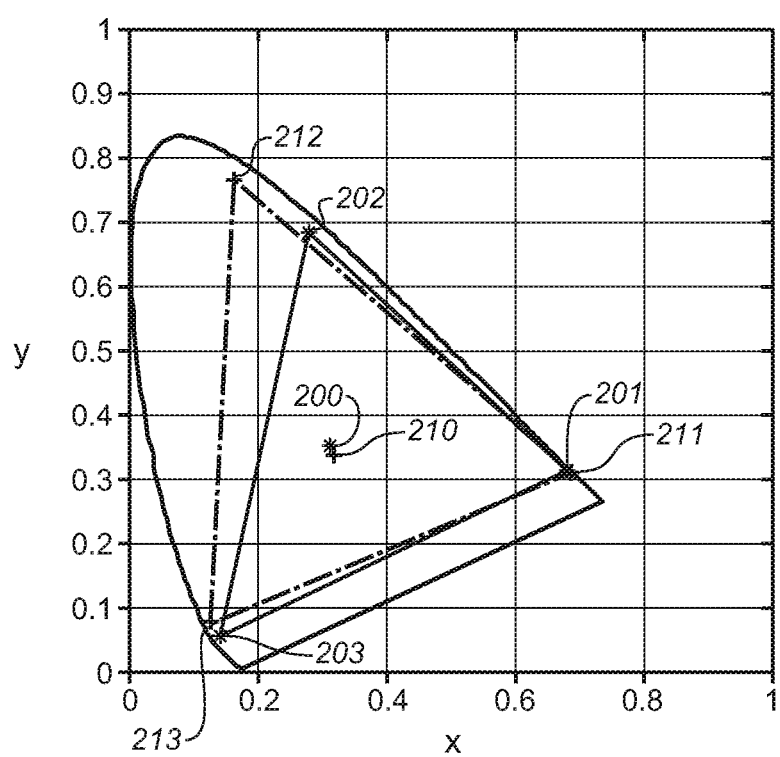
FIG. 3B is a chromaticity diagram showing the reference gamut and the first color gamut of the exemplary projector.

FIG. 3B is a chromaticity diagram with two triangles. One triangle defines the reference color gamut discussed above. The other triangle with corners 211, 212 and 213 represents the first color gamut that is obtained from the projector by the additional filtering provided by the first optical filter. The corners 211, 212 and 213 of the first color gamut represent the most extreme red, green and blue colors that the exemplary projector can present, respectively, when the first optical filter is applied to light somewhere along the optical path of the projector. The point 210 represents the white point of the first color gamut.

Figure 4A:
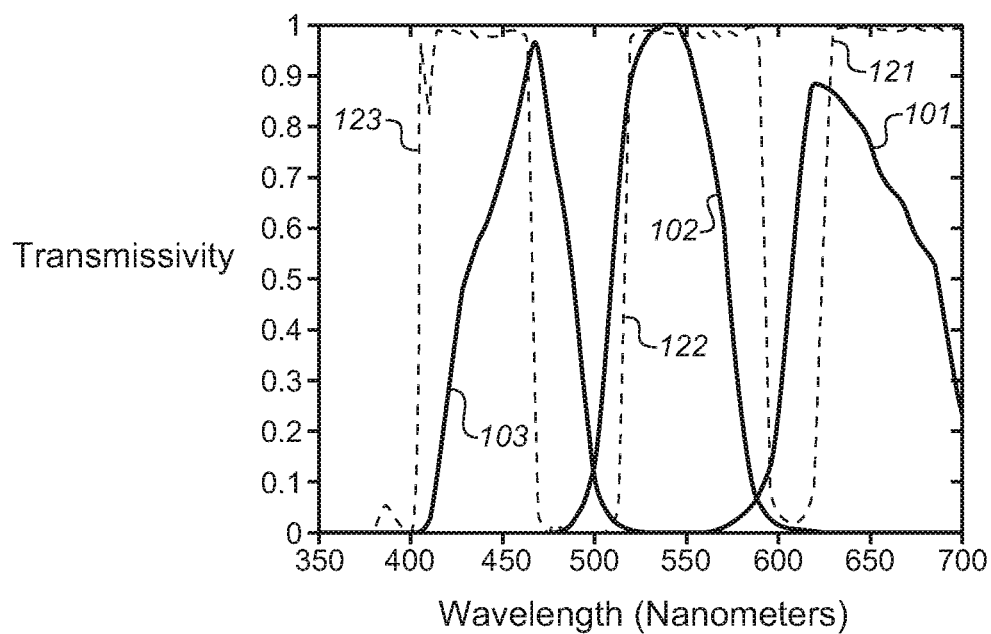
FIG. 4A is a graphical illustration of the wavelengths included in the three subbands and in the passbands of a second optical filter for the exemplary projector.
Figure 5A:
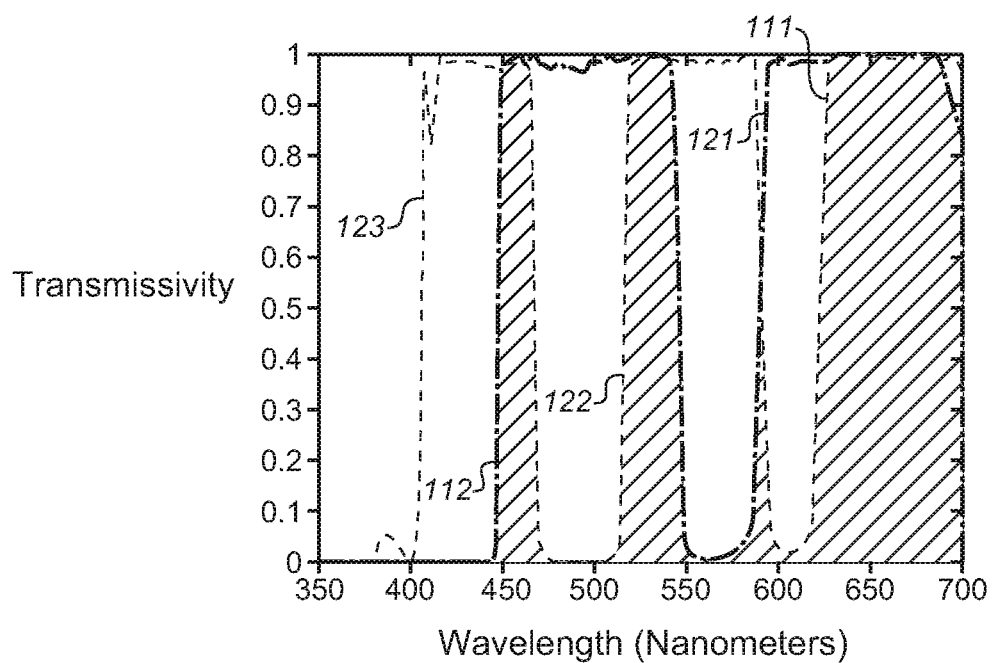
FIG. 5A is a graphical illustration of the wavelengths included in the passbands of the first and second optical filters for the exemplary projector.

FIG. 4A is a graphical illustration of the wavelengths included in the three subbands and in each passband of the second of the two optical filters for the exemplary projector mentioned above. The figure illustrates the normalized transmissivity of each passband 121, 122, 123 in the second optical filter. Each passband overlaps at least a portion of the wavelengths in at least one of the subband light beams but does not include all wavelengths in all subbands. The passbands of the first optical filter collectively overlap the passbands of the second optical filter by an amount that exceeds fifty percent. In other words, at least half of the portion of the visible-light spectrum that is included within the passbands of the second optical filter are also included in the passbands of the first optical filter. The passbands of the two filters are illustrated in FIG. 5A and the overlapping regions are hatched.

Figure 4B:
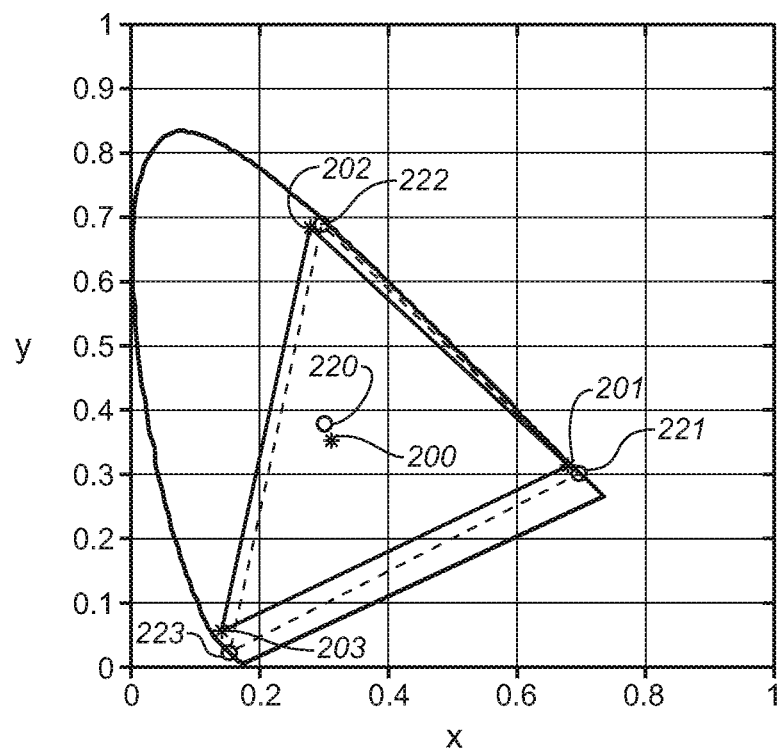
FIG. 4B is a chromaticity diagram showing the reference gamut and the second color gamut of the exemplary projector.

FIG. 4B is a chromaticity diagram with two triangles. One triangle defines the reference color gamut discussed above. The other triangle with corners 221, 222 and 223 represents the second color gamut that is obtained from the projector by the additional filtering provided by the second optical filter. The corners 221, 222 and 223 of the second color gamut represent the most extreme red, green and blue colors that the exemplary projector can present, respectively, when the second optical filter is applied to light somewhere along the optical path of the projector. The point 220 represents the white point of the second color gamut.

If the two optical filters are incorporated into a projector using parallel modulation, the control of the modulators 40 is modified to operate in a manner similar to that used for sequential-modulation implementations. In either implementation, the modulators 40 are controlled to generate color components of the desired color image in the first color gamut when the first optical filter is being applied to the light propagating through the projector, and are controlled to generate color components of the desired color image in the second color gamut when the second optical filter is being applied to the light propagating through the projector.

Figure 5B:
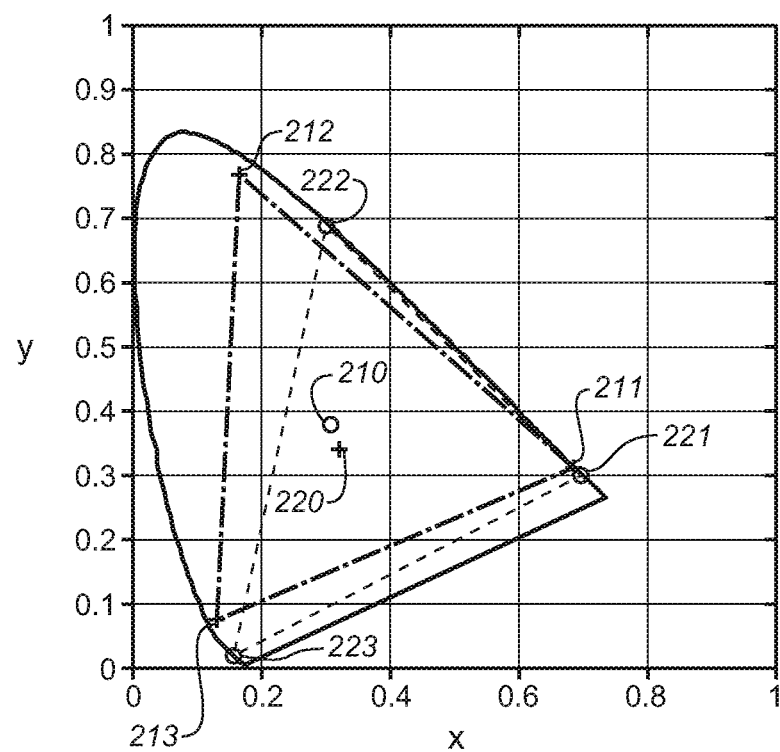
FIG. 5B is an expanded composite gamut obtained from use of the first color gamut and the second color gamut.

When alternating sequences of color components are presented in the first and second color gamuts shown in FIGS. 3B and 4B, respectively, the human visual system integrates the two presentations to create a subjective visual effect that is equivalent to a single presentation within an expanded color gamut that may be represented in the chromaticity diagram of FIG. 5B by a polygon that encompasses the first color gamut and the second color gamut with a boundary contour through the points 211, 222, 212, 213, 223, 221 and back to 211.

4. Alternative Implementations

The particular subbands and optical filters discussed above and represented in the associated figures are only examples for sake of explanation. Other subbands and passbands may be used. The following items should be considered when constructing alternative implementations.

One suitable choice of subbands are those described in the SMPTE 432-1 guidelines mentioned above; however, a greater expansion in the color gamut and/or an increase in efficiency of a digital projector can be achieved if the subbands are modified appropriately for use with the present invention. Preferred modifications expand the width and flatten the tops of the subband shapes such that the subband extents nearly abut one another but have no significant overlap.

The choice of the passbands for the first and second optical filters depends upon the wavelengths included in the subbands of the light they filter but several considerations should be taken into account when designing these filters.

One consideration is that there is a tradeoff between maximum saturation of colors and the maximum brightness that can be achieved for a given light source. Narrower passbands permit higher color saturation but reduce the maximum brightness or luminance level that can be achieved. Greater levels of brightness can be achieved for a given light source as the filter passbands are widened and the amount of overlap between the first and second optical filters is increased.

Another consideration is that the white points of the first and second color gamuts should be established so that the collective effect of these two white points, or the "collective white point," is equal to or nearly equal to the desired white point for the color image. This arrangement will achieve maximum efficiency at the desired white point.

Yet another consideration is that notches in the spectrum of the light that is filtered by the first and second optical filters, which occur at crossover points between subbands, limits the effectiveness of the first and second optical filters for colors at the wavelengths in those notches. It should be readily apparent that a narrow passband located at a notch between subbands cannot produce much if any output. For example, subbands that conform to the SMPTE 432-1 guidelines have a gap between the green and blue subbands. As a result, a highly saturated cyan color cannot be obtained from this light. The present invention can increase the saturation of cyan above what can be achieved otherwise but the amount of increase is limited by the notch between the green and blue subbands. The same situation does not exist for the notch between the red and green subbands because the spectral sensitivity of the cones in the human visual system allow a saturated yellow to be obtained from a much wider spectral bandpass.

Another consideration is that the use of narrow passbands may cause different observers to perceive different colors. In general, wider passbands in the first and second optical filters will reduce this effect.

B. Display

1. Overview of a Display

Figure 6:
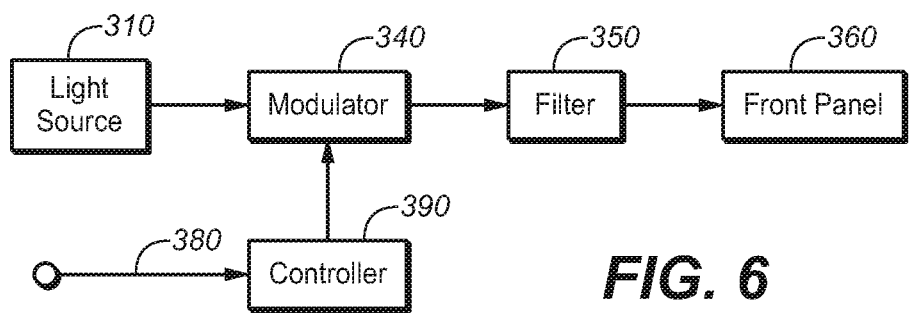
FIG. 6 is a schematic block diagram of a digital display.

FIG. 6 is a schematic block diagram of a digital display like those used in television sets and computer monitors that can incorporate various aspects of the present invention. The light source 310 generates light that passes through the modulator 340, the filter 350, and ultimately through the front panel 360. The modulator 340 is typically implemented as a two-dimensional raster of devices arranged in a plane that defines and modulates individual pixels of the image to be presented in response to a control signal that is received from the controller 390. The filter 350 is typically implemented as an array of components arranged in a plane that establishes subpixels for each pixel that pass light in three or more subbands of the visible-light spectrum. The front panel 360 or other components in the display may polarize or diffuse light but these features are not needed to explain the present invention and are omitted from the figure for illustrative simplicity.

The controller 390 generates the control signal in response to an input signal received from the path 380. In some implementations, the input signal represents the image to be presented and the controller 390 derives the modulation control signals needed to present that image using principles and techniques like those discussed below. Many alternatives are possible. In one alternative, the input signal represents the modulation levels that are needed to present the image and the controller 390 merely controls the timing of the delivery of these signals to the modulator 340.

The components illustrated in FIG. 6 may be implemented in a variety of ways. The light source 310 may be implemented by one or more sets of cold-cathode fluorescent lamps (CCFL) with reflectors, light emitting diodes (LED), or organic LEDs (OLED) arranged in an array to illuminate the back side of the modulator 340. Other implementations may eliminate the filter 350 by using light sources such as LEDs or OLEDs that generate light in three or more subbands or by using other devices behind the modulator 340 that split the light from the light source 310 into three or more subbands. No particular implementation is essential to practice the present invention.

The various implementations of displays may be categorized in a manner similar to that for projectors, using either parallel modulation or sequential modulation. Parallel-modulation implementations present concurrent subpixels in the three or more subbands. Sequential-modulation implementations present an alternating sequence of pixels emitting light in the three or more subbands. The rate of the sequence should be high enough to avoid causing visible flicker in the image.

An exemplary implementation of a digital display is similar to many current implementations of LCD devices. In this implementation, the light source 10 comprises two sets of white LEDs. The modulator 340 is implemented by an array of LCD cells that define pixels arranged in two-dimensional grid. The filter 350 comprises a plane of red, green and blue (RGB) dye filters that define a set of subpixels for each pixel. The front panel 360 comprises planes of glass with a polarizing filter and an anti-reflection coating. Each set of LEDs is coated or covered with a material that implements one of the two optical filters discussed below.

2. Reference Color Gamut

Figure 7A:
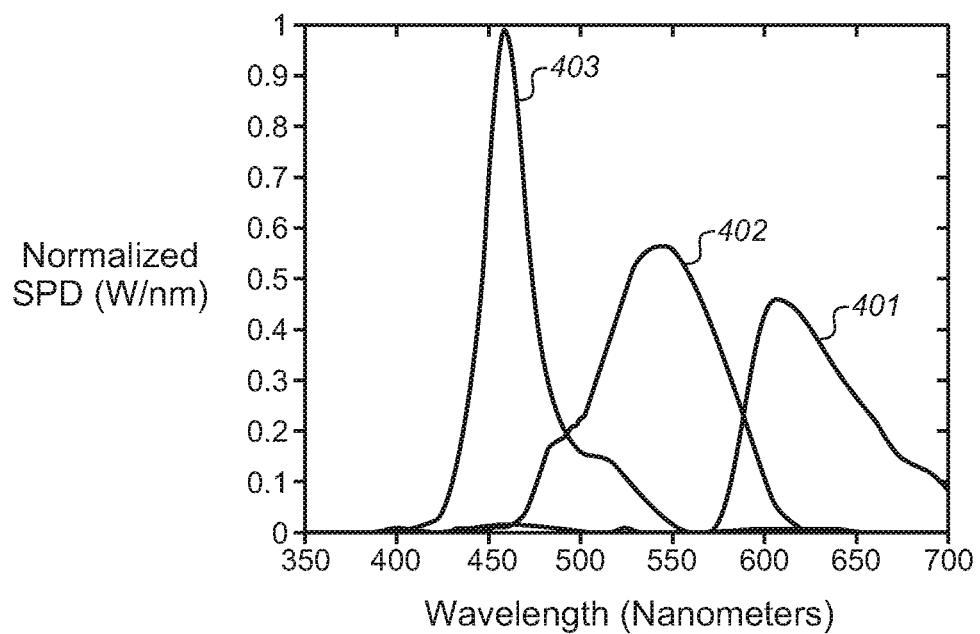
FIG. 7A is a graphical illustration of the wavelengths included in three subbands of the exemplary display.

FIG. 7A is a graphical illustration of the spectral power density of light included in each of three subbands for the exemplary display. The light in the subbands 401, 402 and 403 is perceived as being red, green and blue in color, respectively.

Figure 7B:
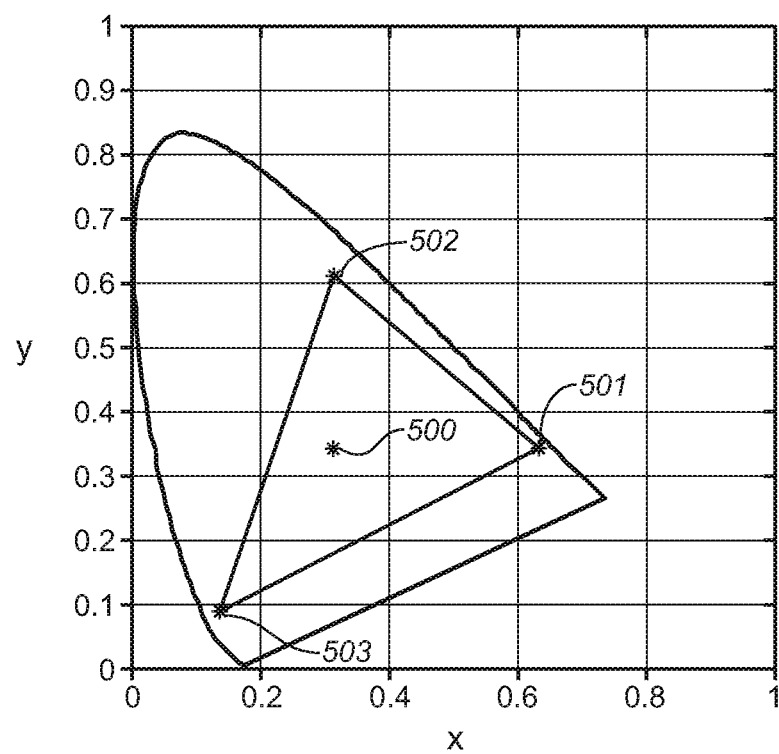
FIG. 7B is a CIE 1931 color space chromaticity diagram showing the reference color gamut of the exemplary display.

FIG. 7B is a CIE 1931 color space chromaticity diagram as described above. The triangle within the horse-shoe shaped curve defines the range of colors, or the color gamut, that can be presented by the exemplary display using light subbands with the range of wavelengths depicted in FIG. 7A. The corners 501, 502 and 503 of the color gamut represent the most extreme red, green and blue colors that the exemplary display can present, respectively. The point 500 represents the white point of this color gamut.

The color gamut of a display can be expanded by practicing various aspects of the present invention. The unexpanded gamut of a display, represented by the triangle shown in FIG. 7B, is referred to as the "reference color gamut" of the display.

3. Expanded Color Gamut

The reference color gamut can be expanded for displays using parallel modulation and sequential modulation. This may be done by designing two optical filters according to teachings of the present invention and incorporating these two optical filters anywhere along the optical path of the display from the light source 310 to the front panel 360. This may be done in a parallel or sequential manner. A parallel-modulation implementation increases the number of subpixels for each pixel to accommodate all combinations of original subbands and passbands of the first and second optical filters. The additional two optical filters may be incorporated into the filter 350, for example. Sequential-modulation implementations incorporate alternate applications of the first and second optical filters for each subpixel.

In an exemplary implementation, the optical filters are implemented sequentially by interference filters affixed to sets of LEDs in the light source 310. Each LED in a first set of LEDs is coated or covered with a material that implements the first optical filter and each LED in a second set of LEDs is coated or covered with a material that implements the second optical filter. The LEDs in the two sets are flashed alternately in succession.

In an alternative sequential-modulation implementation, light from the light source 310 passes through a rotating optical filter wheel that implements the first and second optical filters. The filtered light illuminates a diffuser, such as by edge lighting for example, and this filtered light subsequently passes through the modulators 340.

If the two optical filters are implemented sequentially, the rate of sequential application should be sufficiently high to avoid generating visible flicker for most human observers. A rate of 120 Hz or higher is generally acceptable.

Figure 8A:
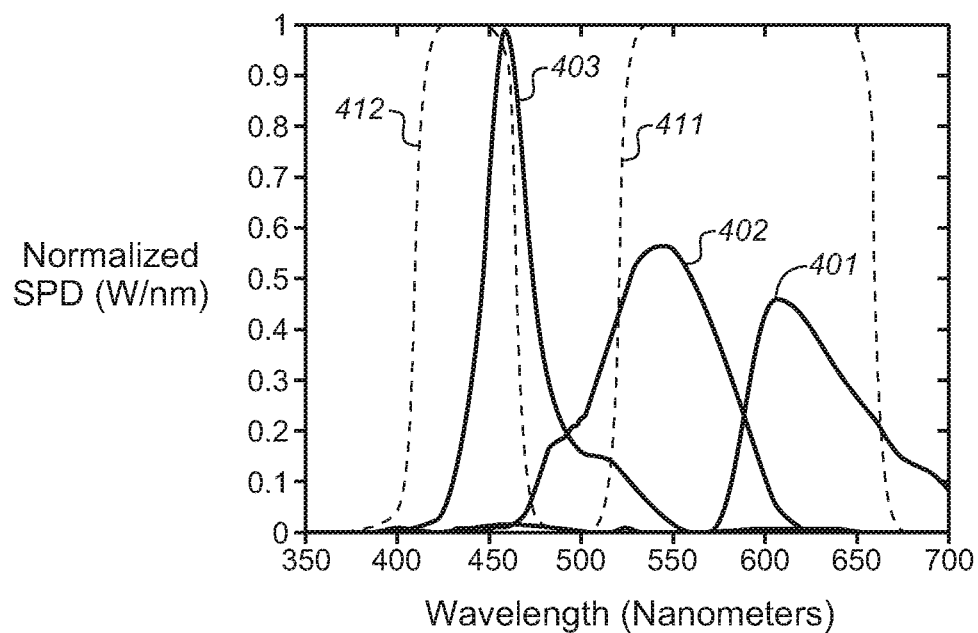
FIG. 8A is a graphical illustration of the wavelengths included in the three subbands and in the passbands of a first optical filter for the exemplary display.

FIG. 8A is a graphical illustration of the wavelengths included in the three subbands and in each passband of the first of the two optical filters for the exemplary display mentioned above. The figure illustrates the normalized transmissivity of each passband 411, 412 in the first optical filter. Each passband overlaps at least a portion of the wavelengths in at least one of the subband light beams but does not include all wavelengths in all subbands.

Figure 8B:
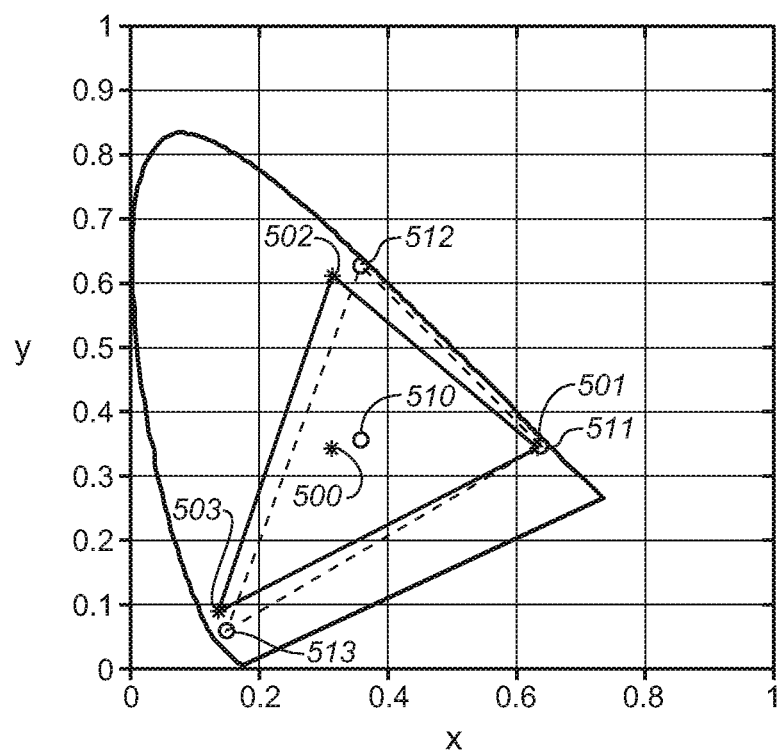
FIG. 8B is a chromaticity diagram showing the reference gamut and the first color gamut of the exemplary display.

FIG. 8B is a chromaticity diagram with two triangles. One triangle defines the reference color gamut discussed above. The other triangle with corners 511, 512 and 513 represents the first color gamut that is obtained from the display by the additional filtering provided by the first optical filter. The corners 511, 512 and 513 of the first color gamut represent the most extreme red, green and blue colors that the exemplary display can present, respectively, when the first optical filter is applied to light somewhere along the optical path of the display. The point 510 represents the white point of the first color gamut.

Figure 9A:
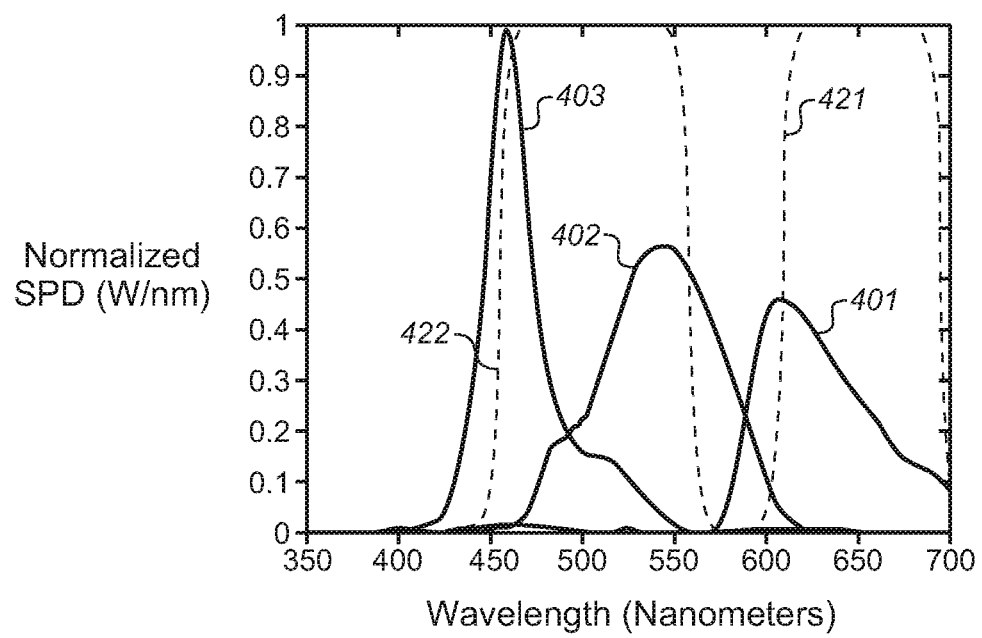
FIG. 9A is a graphical illustration of the wavelengths included in the three subbands and in the passbands of a second optical filter for the exemplary display.
Figure 10A:
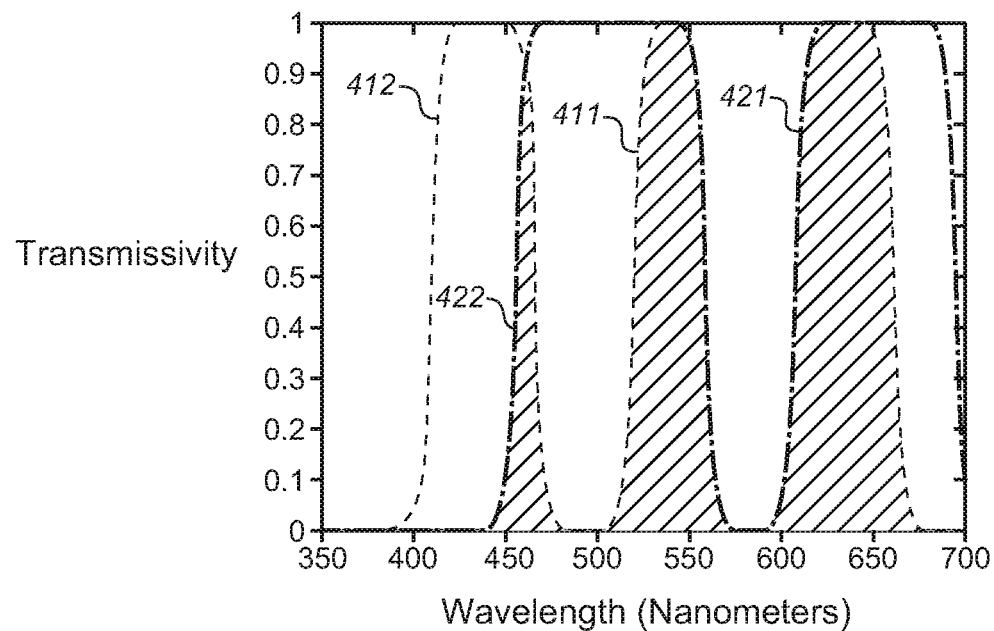
FIG. 10A is a graphical illustration of the wavelengths included in the passbands of the first and second optical filters for the exemplary display.

FIG. 9A is a graphical illustration of the wavelengths included in the three subbands and in each passband of the second of the two optical filters for the exemplary display mentioned above. The figure illustrates the normalized transmissivity of each passband 421, 422 in the second optical filter. Each passband overlaps at least a portion of the wavelengths in at least one of the subband light beams but does not include all wavelengths in all subbands. The passbands of the first optical filter collectively overlap the passbands of the second optical filter by an amount that exceeds fifty percent, as explained above. The passbands of the two filters are illustrated in FIG. 10A and the overlapping regions are cross-hatched.

Figure 9B:
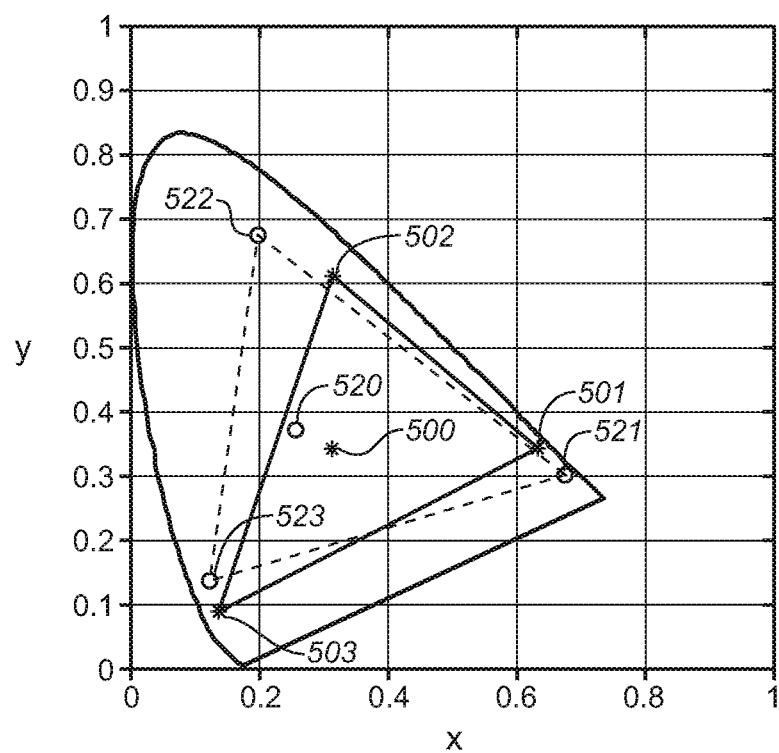
FIG. 9B is a chromaticity diagram showing the reference gamut and the second color gamut of the exemplary display.

FIG. 9B is a chromaticity diagram with two triangles. One triangle defines the reference color gamut discussed above. The other triangle with corners 521, 522 and 523 represents the second color gamut that is obtained for the display by the additional filtering provided by the second optical filter. The corners 521, 522 and 523 of the second color gamut represent the most extreme red, green and blue colors that the exemplary display can present, respectively, when the second optical filter is applied to light somewhere along the optical path of the display. The point 520 represents the white point of the second color gamut.

If the two optical filters are incorporated into a display using parallel modulation, the control of the modulators 340 is modified to operate in a manner similar to that used for sequential-modulation implementations. In either implementation, the modulators 340 are controlled to generate color components of the desired color image in the first color gamut when the first optical filter is being applied to the light propagating through the display, and are controlled to generate color components of the desired color image in the second color gamut when the second optical filter is being applied to the light propagating through the display.

Figure 10B:
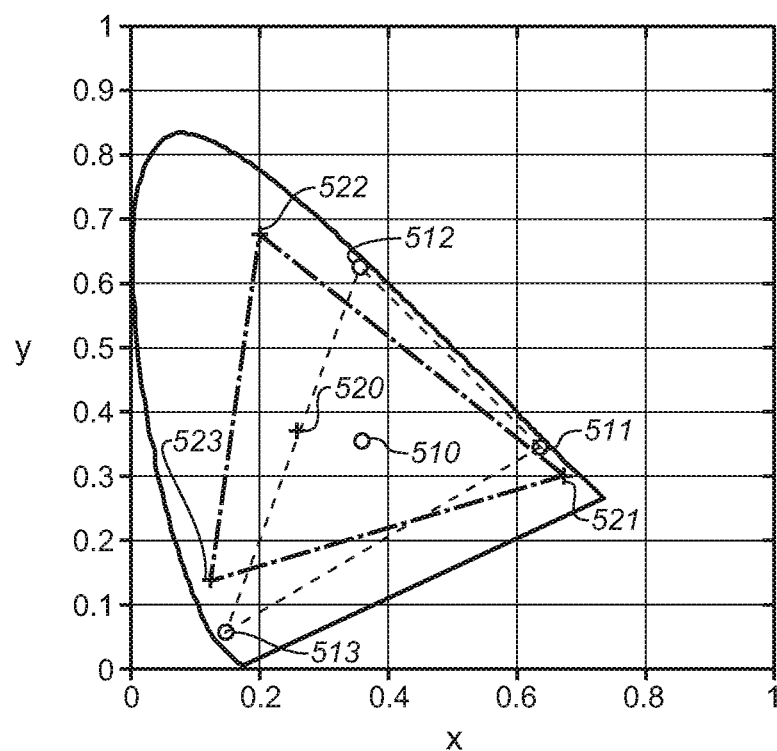
FIG. 10B is an expanded composite gamut obtained from use of the first color gamut and the second color gamut.

When alternating sequences of color components are presented in the first and second color gamuts shown in FIGS. 8B and 9B, respectively, the human visual system integrates the two presentations to create a subjective visual effect that is equivalent to a single presentation within an expanded color gamut that may be represented in the chromaticity diagram of FIG. 10B by a polygon that encompasses the first color gamut and the second color gamut with a boundary contour through the points 511, 512, 522, 523, 513, 521 and back to 511.

4. Alternative Implementations

The particular subbands and optical filters discussed above and represented in the associated figures are only examples for sake of explanation. Other subbands and passbands may be used. The following items should be considered when constructing alternative implementations.

The wavelengths included in the subbands for a conventional LCD device, for example, are affected significantly by the choice of dyes that are used to implement RGB subpixel filters. In general, the subbands for many LCD devices are wider than those for typical digital projectors and they have a small degree of overlap between subbands. Some overlap is permissible because the subpixel filters are in parallel optical paths. As a result, there are no notches in the spectral power density of light in the subbands. This situation is nearly ideal for use with the present invention.

The choice of the passbands for the first and second optical filters depends upon the wavelengths included in the subbands of the light they filter but some of the same considerations discussed above for projectors should be taken into account when designing these filters. These considerations include the tradeoff between maximum saturation and maximum brightness, the location of white points, and the effects passband width has on how color is perceived by a human observer. If a color is perceived incorrectly, this fault is known as observer metameric failure.

C. Flicker Reduction

1. Introduction

The quality of the color image presented by implementations of projectors and displays that apply the first and second optical filters in a sequential manner can be impaired by periodic variations of color and/or brightness of pixels. These variations, referred to herein as flicker, can be avoided or at least reduced using aspects of the present invention that are discussed below. The following discussion refers only to color gamuts of the exemplary projector discussed above; however, the disclosed processes may be used with other implementations of projectors and displays.

Portions of the following discussion refer to the CIE 1931 color space. The use of a color space like the CIE 1931 color space can simplify calculations that are needed to obtain the desired color or an optimum approximation of it for each respective pixel in the presentation of a color image. In the CIE 1931 color space, the chromaticity of a color obtained from a mixture of two other colors is located on a straight line between the two mixed colors. Adjusting the ratio of the two mixed colors causes the resulting color to move along the line between them; therefore, the ratio of intensities for the presentations in the two color gamuts can be determined algebraically.

This characteristic of the CIE 1931 color space is known as Grassmann's law. The ratio of intensities is algebraically related to the locations of the two approximate colors in color space relative to the location of the desired color. Essentially any color space that conforms to Grassman's law can be substituted in the following examples for the CIE 1931 color space.

2. Graphical Illustration of Gamuts

If a pixel has a desired color that comes within both the first and the second color gamuts, the color components of that pixel can be presented accurately and exactly in each gamut. If the pixel has a desired color that is outside either one or both gamuts, however, that desired color cannot be presented accurately in both gamuts and the alternating presentation of the pixel's color components in each gamut will cause flicker in color and/or brightness unless some compensation is made.

Figure 11A:
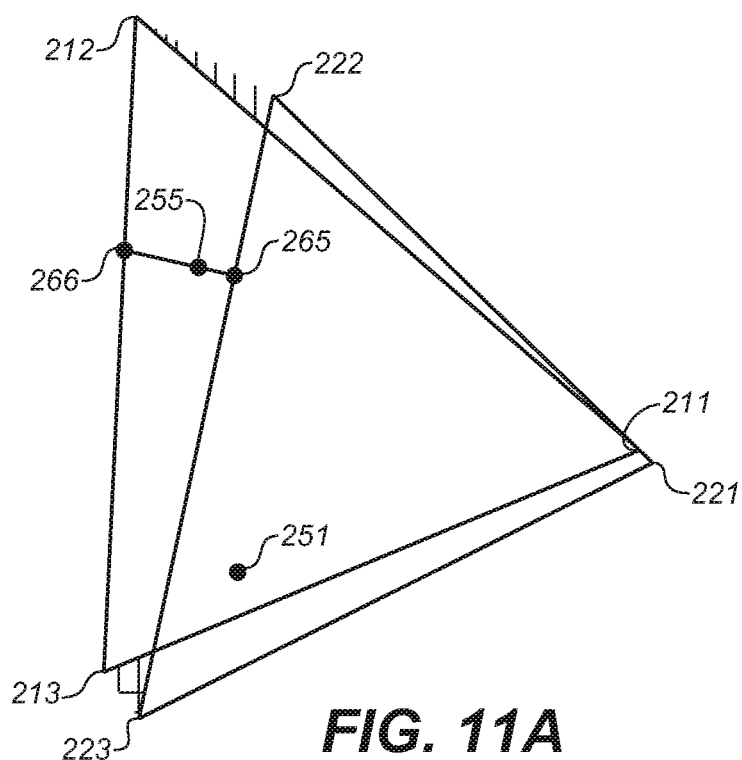
FIGS. 11A and 11B are chromaticity diagrams showing desired colors within and outside of device color gamuts and colors that are used to generate optimum approximate colors for colors that are outside device gamuts.
Figure 11B:
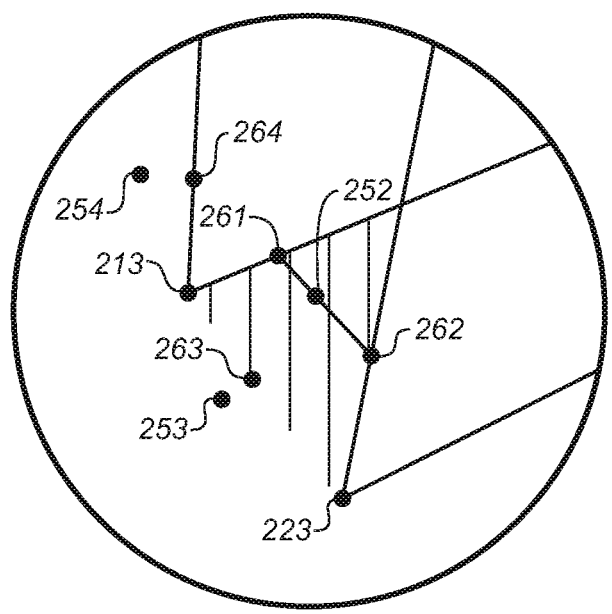

The chromaticity diagrams illustrated in FIGS. 11A and 11B show several situations out of numerous possibilities that may occur. Steps that may be performed to reduce flicker in these three situations are illustrated in the flowcharts of FIGS. 12A, 12B and 12C, respectively.

a) In-Gamut/In-Gamut (IGIG)

FIG. 11A illustrates the desired color of a pixel represented by the point 251 that comes within a first color gamut, represented by the triangle with the corners 211, 212 and 213, and within a second color gamut, represented by the triangle with the corners 221, 222 and 223. These gamuts correspond to the first and second color gamuts for the exemplary projector discussed above and the following discussion refers to this exemplary implementation; however, the principles and processes discussed here also apply to other implementations of projectors and displays.

Figure 12A:
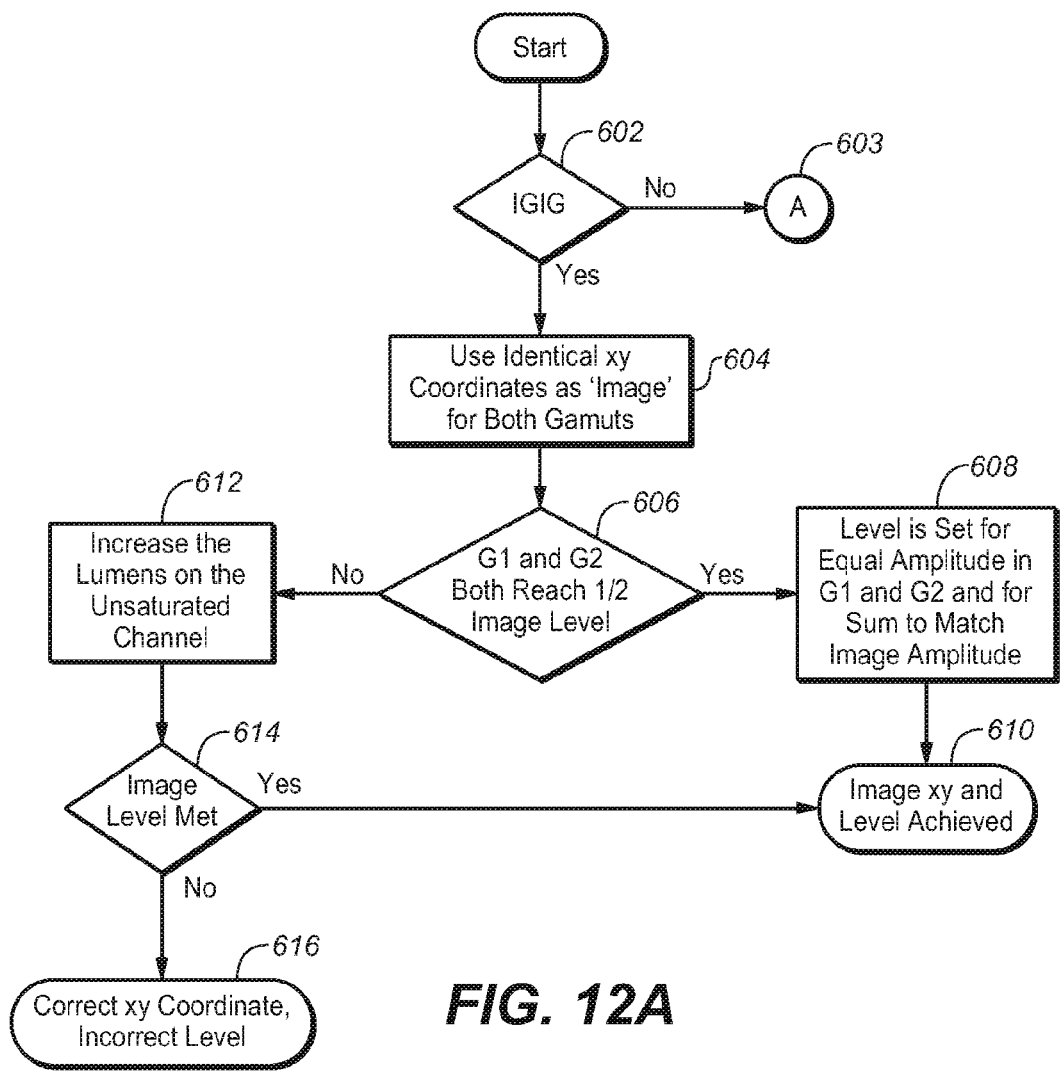
FIGS. 12A through 12C are flow diagrams that illustrate steps in one method that may be used to reduce flicker in sequential-modulation implementations.
Figure 12B:
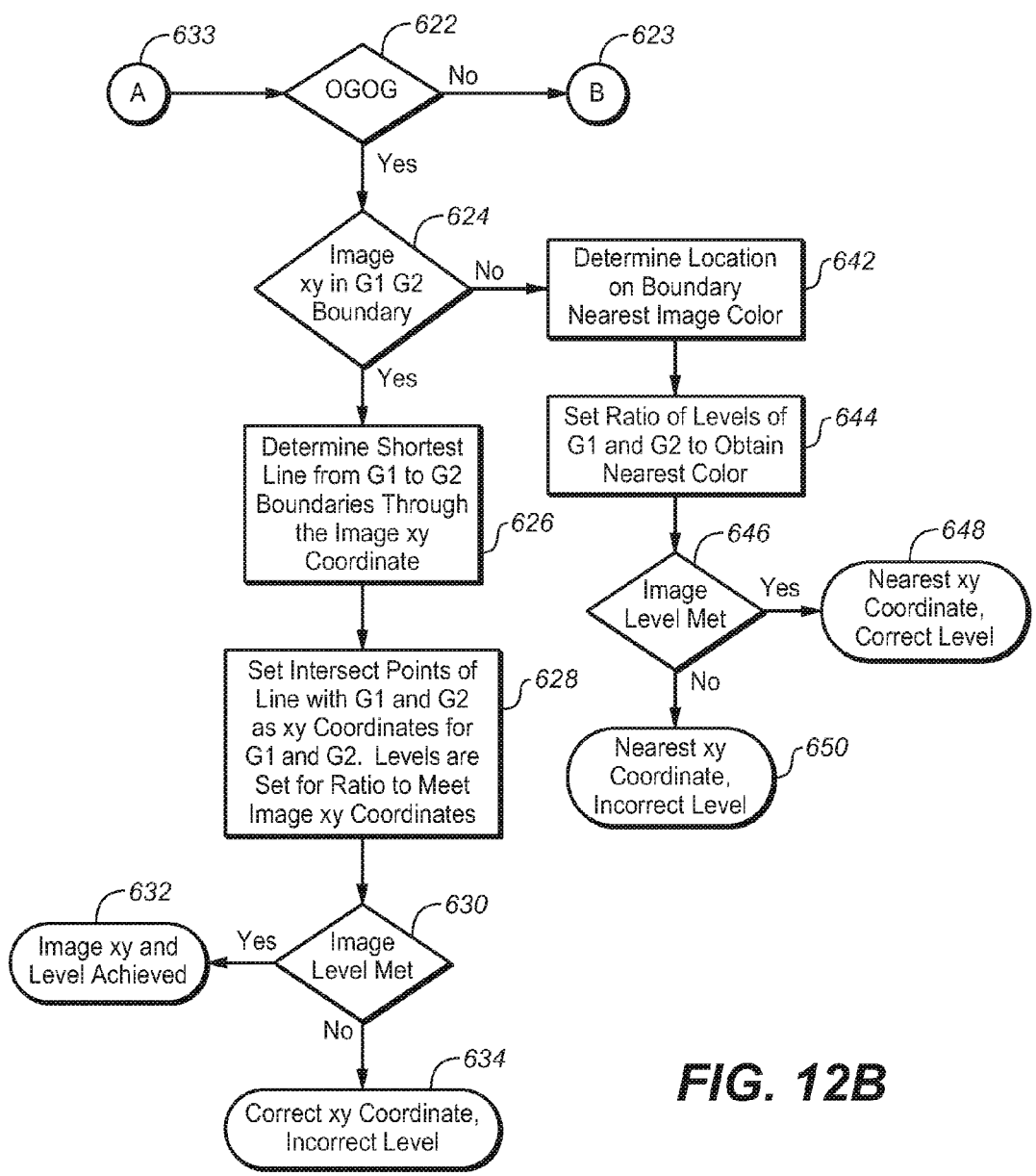
Figure 12C:
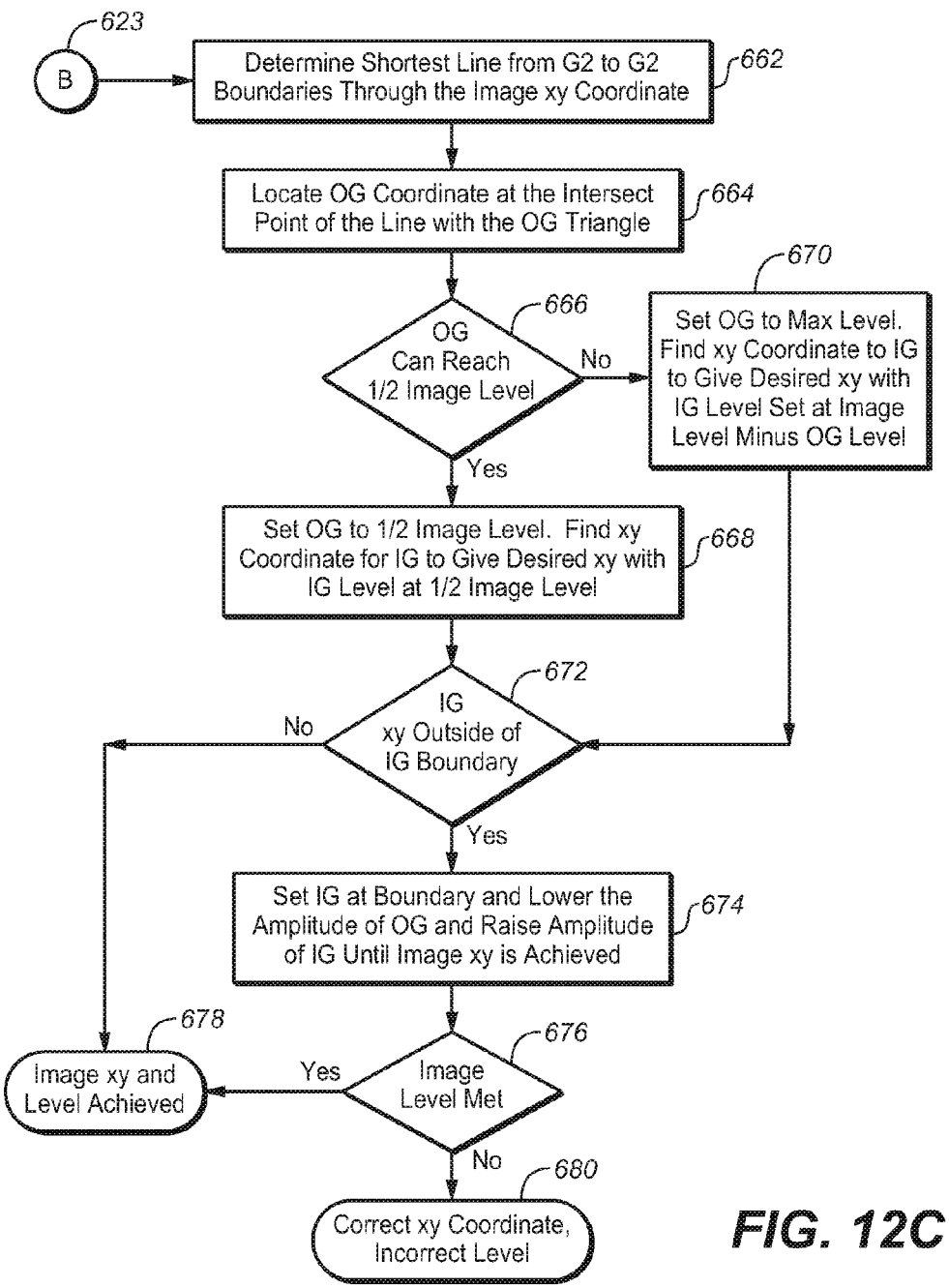

Referring to FIG. 12A, step 602 determines whether the desired color is within the first color gamut and within the second color gamuts. If both conditions are not true, processing continues through the node 603 to step 622. If both conditions are true, processing continues with step 604, which prepares to instruct the modulator 40 to generate color components for the same desired color in the presentations for both color gamuts. Step 606 determines whether the presentation in both color gamuts can achieve one-half of the desired brightness for the pixel. If this level can be achieved for both color gamuts, the modulator 40 can be controlled in a straightforward way to present the appropriate color components at a level of intensity in each gamut needed to achieve the overall desired color and brightness level. This result is represented by step 610.

If step 606 determines that the presentation for either of the color gamuts cannot achieve at least half of the pixel's desired brightness, processing continues with step 612 to modify the control of the modulator 40. When the maximum brightness level that can be achieved by the presentation in one color gamut is less than one-half the desired brightness, step 612 controls the modulator 40 to obtain the maximum possible brightness level for the presentation in that one color gamut and controls the modulator 40 to increase the brightness level of the presentation in the other color gamut until the presentations in both gamuts collectively achieve the appropriate level of brightness, represented by step 610, or until the maximum possible brightness level is obtained for the presentation in the other color gamut. If the two presentations cannot collectively achieve the appropriate level of brightness, as represented by step 616, the modulator 40 provides the maximum possible level of brightness for the presentation in each color gamut, which will result in the pixel being presented with the desired color and with an optimum approximation of its desired brightness. The human visual system can integrate across the alternating presentations and perceive the desired brightness if the two presentations are alternated at a rate that is high enough.

b) Out-of-Gamut/Out-of-Gamut (OGOG)

FIG. 11B illustrates three desired colors 252, 253, 254 that are outside both the first color gamut and the second color gamut. The desired color 252 is within the expanded color gamut but the desired colors 253, 254 are outside the expanded color gamut. As explained above, the expanded color gamut is represented by the polygon that encompasses the two triangles representing the first and second color gamuts. One of the regions of the color space that is outside the first and second color gamuts but within the expanded color gamut is represented by the cross-hatched area.

If step 602 determines that the desired color is not within both of the first and second color gamuts, processing continues through the node 603 to step 622. Referring to FIG. 12B, step 622 determines whether the desired color is outside both the first and second color gamuts. If not, processing continues through the node 623 to step 662. If the desired color is outside both color gamuts, processing continues with step 624, which determines whether the desired color is within the expanded color gamut.

(1) Within the Expanded Color Gamut

If the desired color is within the expanded color gamut, processing continues with step 626. For colors like that represented by the point 252 within the expanded color gamut, an "approximate color" is determined in each of the first and second color gamuts such that the two approximate colors collectively provide the desired color 252. One way to determine the two approximate colors is represented by steps 626 and 628. Step 626 determines a first shortest line in CIE 1931 color space between adjacent boundaries of the first and second color gamuts that passes through the coordinates of the desired color. Step 628 identifies the intersection of the first shortest line with the boundaries of each color gamut. These intersections define the coordinates of the two approximate colors. Referring to FIG. 11B, the intersection of the first shortest line with the boundaries of the first and second color gamuts defines the points 261 and 262, which represent the two approximate colors.

After the two approximate colors are determined, the modulator 40 is controlled to present the appropriate color components and brightness level in each color gamut. This is done by determining in step 628 the ratio of intensities for the presentations in the two color gamuts to achieve the desired color, and then setting the brightness levels to achieve the desired brightness level or an optimum approximation of the desired brightness level if the exact desired brightness level cannot be achieved.

After determining the ratio of intensities, the modulator 40 is controlled to achieve the appropriate brightness level for the presentation in each color gamut such that the desired overall brightness level is achieved as well as the calculated ratio of brightness levels between the two presentations. This result is represented by the step 632. If step 630 determines that the overall brightness level cannot be achieved, then the modulator 40 is controlled to obtain the highest possible brightness level for the presentation in each color gamut that provides the calculated ratio of intensity between the two presentations, thereby achieving an optimal approximation of the desired overall brightness level. This result is represented by the step 634.

(2) Outside the Expanded Color Gamut

If the desired color is not within the expanded color gamut, processing continues with step 642. For colors like that represented by the points 253, 254 outside the expanded color gamut, step 642 determines a color in the boundary of the expanded color gamut that is close to the desired color. The portion of the expanded color gamut boundary that extends between the first and second color gamuts defines a second shortest line between the gamuts and two approximate colors are determined for the close color in the same way that is done for the desired color 252 itself. The color within the expanded color gamut that is close to the desired color may be determined in a variety of ways. One way constructs a line through the point representing the desired color that is orthogonal to the boundary of the expanded color gamut. For color 253, this method establishes the closest color as the color represented by the point 263. Alternatively, a close color may be obtained by determining the line that passes through the desired color and either the collective white point of the two color gamuts or the white point of the respective color gamut and selecting the point defined by the intersection of this line with the boundary of the expanded color gamut. This alternative approach selects a color that has the same hue as the desired color and differs only in saturation.

The two approximate colors determined for the color 263 are represented by the points 213 and 223. Step 644 determines the ratio of intensities for the presentations in the two color gamuts as described above for point 252. If the correct brightness levels can be achieved for each presentation while maintaining the calculated ratio, the overall desired brightness level is achieved as represented by step 648; otherwise, the closest approximation to this desired brightness level will be achieved as represented by step 650.

An optimal approximation of the desired colors 253, 254 will be achieved from the collective effect of presentations in the first and second color gamuts whose respective brightness levels are controlled to obtain the calculated ratio of intensities, as described above. A presentation of the desired color and brightness level of the color 253 will be achieved from a mix of the colors 213, 223 and brightness levels of the presentations in the first and second color gamut according to the calculated ratio. This is also true for the color 254 but, for this example, the calculated ratio between the first and second color gamuts is 1:0. A presentation of the desired color 254 and its desired brightness level will be achieved from the closest approximation that can be obtained from the presentation in only the first color gamut.

c) In-Gamut/Out-of-Gamut (IGOG)

FIG. 11A illustrates the desired color 255 that is outside one of the color gamuts but is within the other color gamut. In the example shown, the desired color is within the first color gamut and outside of the second color gamut but the same techniques and principles apply to pixels with desired colors within the second color gamut and outside the first color gamut.

If step 622 determines that the desired color is within either the first color gamut or the second color gamuts but not within both of these color gamuts, processing continues through the node 623 to perform a process that determines an approximate color in each of the first and second color gamuts such that the two approximate colors collectively provide the desired color 255. After the two approximate colors are determined, the modulator 40 is controlled to present the appropriate color components and brightness level in each color gamut in a manner analogous to that described above for the color 252. This is done by determining the ratio of intensities for the presentations in the two color gamuts to achieve the desired color, and then setting the brightness levels to achieve the desired brightness level or an optimum approximation of the desired brightness level if the exact desired brightness level cannot be achieved. Preferably, the two approximate colors are chosen such that the ratio of brightness levels for the presentations in the two color gamuts is 1:1.

One process that may be used to determine these two approximate colors is illustrated in FIG. 12C. Step 662 determines the shortest line in CIE 1931 color space between the coordinates of the desired color and the boundary of the second color gamut. Alternatively, step 662 may determine the line that passes through the desired color and the collective white point of the two color gamuts. Step 664 identifies the intersection of the line with the boundary of the second color gamut to establish one approximate color 265 as that color in the second color gamut that is closest to the desired color.

Step 666 determines whether the presentation for the color 265 in the second color gamut can achieve one-half the desired brightness level. If this is possible, step 668 attempts to determine the approximate color in the first color gamut that will achieve the desired color when the brightness level for its presentation is set to one-half the desired brightness level using Grassmann's law. If the sought-for color in the first color gamut is found within the first color gamut, the desired color and the desired brightness level can be achieved, as represented by step 678.

If step 672 determines that the sought-for color does not exist within the first color gamut, processing continues with step 674, which sets the approximate color within the first color gamut at the intersection of the first color gamut boundary with the line determined in step 662. This color is represented by the point 266 in FIG. 11A. Step 674 raises the brightness level of the presentation for the first color gamut and lowers the brightness level of the presentation for the second color gamut using algebraic calculations according to Grassmann's law to achieve the desired color. If this can be done while also achieving the desired brightness level, step 678 represents the results that are achieved. If step 676 determines the desired brightness level cannot be achieved, the closest approximation to this desired brightness level will be achieved as represented by step 680.

If step 666 determines that the presentation for the second color gamut cannot achieve one-half the desired brightness level, step 670 determines the color and the ratio of intensity needed between presentations for the two color gamuts to achieve the desired color. This may be done algebraically according to Grassmann's law as explained above. If step 672 determines that the candidate color in the first color gamut has reached the boundary of that gamut, then no further changes can be made. Processing continues as described above for steps 672, 674, 676, 678 and 680.

D. Methods of Implementation

A variety of methods that implement aspects of the present invention may be used to expand the color gamut of a projector or display and reduce flicker in the presentation of a color image. A few examples are described below.

1. Methods for Gamut Expansion

According to one aspect of the present invention, a method for presenting a color image applies a first optical filter and a second optical filter to light in three or more subbands of the visible-light spectrum. Each optical filter has two or more passbands and the passbands of the two filters are not the same. The passbands of the first optical filter collectively overlap the passbands of the second optical filter by an amount that exceeds fifty percent as explained above. The subbands establish a reference color gamut representing a range of colors and each passband in the first and second optical filters overlaps at least a portion of at least one of the subbands but does not include all wavelengths in all of the subbands.

The light in the three or more subbands is modulated in response to an input signal to generate modulated color components of the color image in a first color gamut and in a second color gamut. The first color gamut differs from the reference color gamut and defines a range of colors capable of being presented by the light in the three or more subbands as filtered by the first optical filter. The second color gamut differs from the first color gamut, it differs from the reference color gamut and it defines a range of colors capable of being presented by the light in the three or more subbands as filtered by the second optical filter.

The modulated color components in the first color gamut and the second color gamut collectively present the color image with a range of colors in an expanded color gamut that is larger than the reference color gamut.

The light in the three or more subbands may be obtained from a plurality of light sources that emit light in those subbands or it may be obtained by splitting light into those subbands.

The presentation of color components in the first and second color gamuts may be done simultaneously in parallel with each other, or they may be presented in alternating intervals.

The color components may be modulated by transmissive or reflective devices in response to the input signal.

This technique may be applied in projectors and displays using a wide variety of implementations including those mentioned above. In one implementation, an optical filter wheel implements the first and second optical filters, spatial light modulators like DMDs, LCDs or LCOS devices are used to modulate the color components of the image for presentation, and the modulators and the filter wheel are controlled such that the first optical filter is applied when color components are modulated for presentation in the first color gamut and the second optical filter is applied when color components are modulated for presentation in the second color gamut. The presentations in the two color gamuts alternate with one another.

2. Methods for Flicker Reduction

According to one aspect of the present invention, a method for reducing flicker in a presentation of a respective pixel of a color image in a desired color and at a desired brightness level in an alternating sequence of presentations for distinct first and second color gamuts determines whether the desired color of the respective pixel is within the first color gamut and within the second color gamut.

If the desired color is within the first color gamut and within the second color gamut, the light is modulated to adjust the brightness of the presentation of the respective pixel in either or both of the first and second color gamuts, thereby achieving the desired color and either the desired brightness level or an optimum approximation of the desired brightness level for the respective pixel.

If the desired color is not within the first color gamut and is not within the second color gamut, a first approximate color is determined in the first color gamut that provides an optimal approximation of the desired color, and a second approximate color is determined in the second color gamut that provides an optimal approximation of the desired color. The light is modulated to adjust the brightness and the color of the presentation of the respective pixel in the first color gamut to present the first approximate color. The light is also modulated to adjust brightness and color of the presentation of the respective pixel in the second color gamut to present the second approximate color. This modulation achieves either the desired color or an optimum approximation of the desired color and either the desired brightness level or an optimum approximation of the desired brightness level for the respective pixel.

If the desired color is within the first color gamut but not within the second color gamut, the second approximate color is determined in the second color gamut that provides an optimal approximation of the desired color and the first approximate color is determined in the first color gamut such that the desired color is between the first approximate color and the second approximate color. The light is modulated to adjust brightness and color of the presentation of the respective pixel in the first color gamut to present the first approximate color and to adjust brightness and color of the presentation of the respective pixel in the second color gamut to present the second approximate color, thereby achieving the desired color and either the desired brightness level or an optimum approximation of the desired brightness level for the respective pixel.

In a first variation of the method described above, if the desired color is within the first color gamut and within the second color gamut, the light is modulated to obtain equal brightness levels of the presentation of the respective pixel in the first color gamut and in the second color gamut if the desired brightness level can be achieved in the first and second color gamuts; or the light is modulated to obtain a maximum brightness level for the presentation of the respective pixel in one of the first and second color gamuts and a brightness level below the maximum for the presentation in the other one of the first and second color gamuts if the desired brightness level can be achieved; otherwise, the light is modulated to obtain brightness levels at a maximum for the presentation of the respective pixel in both the first and second color gamuts.

In a second variation of the method described above, the first approximate color and the second approximate color may be determined by identifying in a color space whether a shortest line exists between the first color gamut and the second color gamut that passes through a point in the color space representing the desired color. There are two possibilities for the second approximate color. Either the second approximate color is established at a point in the color space where the shortest line intersects a boundary of the second color gamut if the shortest line exists, or the second approximate color is established at a point in the second color gamut nearest the desired color if the shortest line does not exist. There are three possibilities for the first approximate color. Either the first approximate color is established at a point in the first color gamut nearest the desired color if the shortest line does not exist, the first approximate color is established where the shortest line intersects a boundary of the first color gamut if the shortest line exists and if the desired color is not within the first color gamut, or the first approximate color is established on the shortest line on a side of the desired color opposite where the shortest line intersects a boundary of the first color gamut if the shortest line exists and if the desired color is within the first color gamut.

The second variation may modulate the light to obtain a ratio of brightness levels of the presentations of the respective pixel in the first color gamut and in the second color gamut to achieve a presentation of either the desired color or an optimum approximation of the desired color if the desired color is not within the first color gamut and is not within the second color gamut.

3. Efficient Implementations

The modulation control processes discussed above may be implemented by a process that controls the modulator 40 using one or more lookup tables containing values of color components for a set of desired colors and desired brightness levels. A lookup table is consulted for each respective pixel using data representing the desired color and brightness level of that pixel, and nearest-neighbor values obtained from the table are interpolated to derive modulation control signals for the modulator 40. In one implementation, three values representing a desired color and brightness are used to consult a lookup table, which provides two sets of three values each representing modulation control values for the modulator 40 to obtain the appropriate color for the presentation in each of the first and second color gamuts.

The lookup tables may be derived using a color-conversion transform to construct an array of color-conversion coefficients for a desired set of colors in some color space covering the IGIG, OGOG and IGIG cases and then using the techniques discussed above to modify these coefficients as needed. The choice of transform is influenced by the choice of data used to represent the color image, the choice of color space in which principles of the invention are to be applied, and the choice of subband wavelengths for the modulator 40. A Bradford transform and CIE 1931 color space are convenient choices for many applications but other choices are possible. Alternative color spaces include the 1960 CIE Uniform Chromaticity Space, and non-linear spaces like the CIE 1976 (L*a*b*) and CIE 1976 (L*u*v*) color spaces. If a non-linear color space is used, it may be desirable to convert to a linear space so that a linear transform like a Bradford matrix can be used. Although the choice of color-conversion transform and the choice of color spaces can influence performance, no particular choices are essential to practice the present invention. Additional information about lookup tables and color conversion matrices may be obtained from a variety of sources including Pascale, A review of RGB Color Space, The BabelColor Company, Montreal, Canada, 2002-2003, which was available at the time of this writing at: http://www.babelcolor.com/download/A%20review%20of%20RGB%20color%20spaces.pdf.

E. Devices for Implementation

The controllers 90 and 390 discussed above may be implemented in a variety of ways including discrete logic components, integrated circuits, one or more ASICs and/or program-controlled processors. The manner of implementation is not important to the present invention.

Figure 13:
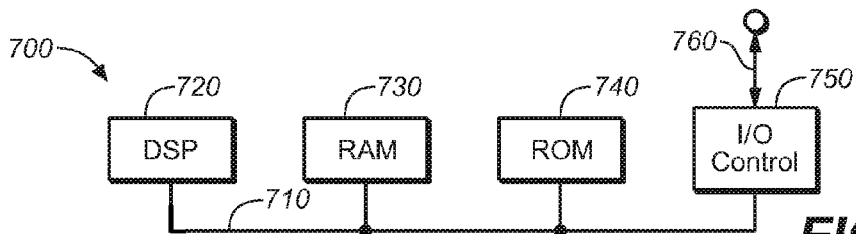
FIG. 13 is a functional block diagram of a device that may be used to implement various aspects of the present invention.

FIG. 13 is a schematic block diagram of a device 700 that may be used to implement aspects of the present invention by program-controlled processors. The processor 720 provides computing resources. RAM 730 is system random access memory (RAM) used by the processor 720 for processing. ROM 740 represents some form of persistent storage such as read only memory (ROM) for storing programs needed to operate the device 700 and possibly for carrying out various aspects of the present invention. I/O control 750 represents interface circuitry to receive and transmit signals by way of the communication path 760, which may be the paths 80 and 380 discussed above. In the implementation shown, all major system components connect to the bus 710, which may represent more than one physical or logical bus; however, a bus architecture is not required to implement the present invention.

Software implementations of the present invention may be recorded or stored by a variety of machine readable storage media that convey information using essentially any recording technology including magnetic tape, cards or disk, optical cards or disc, and detectable markings on media including paper.

Accordingly, the invention may be embodied in any of the forms described herein, including, but not limited to the following Enumerated Example Embodiments (EEEs) which describe structure, features, and functionality of some portions of the present invention:

EEE1. A method for processing light to present a color image, the method comprising:
 (a) applying a first optical filter having two or more passbands to light in three or more subbands of visible-light spectrum, wherein:
  the subbands establish a reference color gamut representing a range of colors, and
  each passband in the first optical filter overlaps at least a portion of at least one of the subbands but does not include all wavelengths in all of the three or more subbands;
 (b) applying a second optical filter having two or more passbands to light in the three or more subbands, wherein:
  the passbands of the first optical filter differ from the passbands of the second optical filter,
  the passbands of the first optical filter collectively overlap the passbands of the second optical filter by an amount that exceeds fifty percent, and
  each passband in the second optical filter overlaps at least a portion of at least one of the subbands but does not include all wavelengths in all of the three or more subbands;
 (c) modulating the light carried in the three or more subbands in response to an input signal to generate modulated color components of the color image in a first color gamut and in a second color gamut, wherein:
  the first color gamut differs from the reference color gamut and defines a range of colors capable of being presented by the light in the three or more subbands as filtered by the first optical filter, and
  the second color gamut differs from the first color gamut, differs from the reference color gamut and defines a range of colors capable of being presented by the light in the three or more subbands as filtered by the second optical filter; and
 (d) presenting the modulated color components in the first color gamut and the second color gamut to present the color image with a range of colors in an expanded color gamut that is larger than the reference color gamut.

EEE2. The method of EEE 1 that comprises driving three or more light sources to generate light in the three or more subbands, each subband having a respective bandwidth that is less than one-half of an optical band spanned by the three or more subbands.

EEE3. The method of EEE 1 that comprises:
 driving one or more light sources to generate a source light having a bandwidth that spans the three or more subbands; and
 splitting the source light into the three or more subbands.

EEE4. The method of any one of EEEs 1 through 3 that presents intervals of the modulated color components in the first color gamut alternating with intervals of the modulated color components in the second color gamut.

EEE5. The method of any one of EEEs 1 through 4 that presents a respective pixel of the color image for a desired color and a desired brightness level, wherein the method comprises:
 (1) determining whether the desired color of the respective pixel is within the first color gamut and within the second color gamut;
 (2) if the desired color is within the first color gamut and within the second color gamut, modulating the light to adjust brightness of the presentation of the respective pixel in either or both of the first and second color gamuts, thereby achieving the desired color and either the desired brightness level or an optimum approximation of the desired brightness level for the respective pixel;
 (3) if the desired color is not within the first color gamut and is not within the second color gamut:
  (a) determining a first approximate color in the first color gamut that provides an optimal approximation of the desired color, and determining a second approximate color in the second color gamut that provides an optimal approximation of the desired color, and
  (b) modulating the light to adjust brightness and color of the presentation of the respective pixel in the first color gamut to present the first approximate color and to adjust brightness and color of the presentation of the respective pixel in the second color gamut to present the second approximate color, thereby achieving either the desired color or an optimum approximation of the desired color and either the desired brightness level or an optimum approximation of the desired brightness level for the respective pixel; and (4) if the desired color is within the first color gamut but not within the second color gamut:
    (a) determining the second approximate color in the second color gamut that provides an optimal approximation of the desired color and determining the first approximate color in the first color gamut such that the desired color is between the first approximate color and the second approximate color, and
    (b) modulating the light to adjust brightness and color of the presentation of the respective pixel in the first color gamut to present the first approximate color and to adjust brightness and color of the presentation of the respective pixel in the second color gamut to present the second approximate color, thereby achieving the desired color and either the desired brightness level or an optimum approximation of the desired brightness level for the respective pixel.

EEE6. The method of any one of EEEs 1 through 3 that presents the modulated color components in the first color gamut simultaneously with the modulated color components in the second color gamut.

EEE7. The method of any one of EEEs 1 through 6 that comprises using an electronically controlled reflective medium to modulate the light in the three or more subbands in response to the input signal.

EEE8. The method of any one of EEEs 1 through 6 that comprises using an electronically controlled transmissive medium to modulate the light in the three or more subbands in response to the input signal.

EEE9. The method of any one of EEEs 1 through 8 that comprises using planes of optical filters in a display device to apply the first and second optical filters to the light in the three or more subbands.

EEE10. The method of any one of EEEs 1 through 7 that comprises:
    using an optical filter wheel that comprises the first optical filter and the second optical filter to apply the first and second optical filters to the light in the three or more subbands;
    using spatial light modulators to modulate the light in the three or more subbands, thereby presenting the color image as a series of pictures arranged in frames, each frame comprising a first subframe picture and a second subframe picture;
    controlling the optical filter wheel such that the first optical filter is applied when the first subframe picture is presented and the second optical filter is applied when the second subframe picture is presented; and
    presenting the modulated color components.

EEE11. The method of EEE 10 that comprises using a color-splitting prism to split the light into the three or more subbands.

EEE12. The method of EEE 10 that comprises using a color separation filter to split the light into the three or more subbands.

EEE13. A method for presenting a respective pixel of a color image for a desired color and a desired brightness level in an alternating sequence of presentations for a first color gamut and a second color gamut that differs from the first color gamut, wherein the method comprises:
    (1) determining whether the desired color of the respective pixel is within the first color gamut and within the second color gamut;
    (2) if the desired color is within the first color gamut and within the second color gamut, modulating the light to adjust brightness of the presentation of the respective pixel in either or both of the first and second gamuts, thereby achieving the desired color and either the desired brightness level or an optimum approximation of the desired brightness level for the respective pixel;
    (3) if the desired color is not within the first color gamut and is not within the second color gamut:
        (a) determining a first approximate color in the first color gamut that provides an optimal approximation of the desired color, and determining a second approximate color in the second color gamut that provides an optimal approximation of the desired color, and
        (b) modulating the light to adjust brightness and color of the presentation of the respective pixel in the first color gamut to present the first approximate color and to adjust brightness and color of the presentation of the respective pixel in the second color gamut to present the second approximate color, thereby achieving either the desired color or an optimum approximation of the desired color and either the desired brightness level or an optimum approximation of the desired brightness level for the respective pixel; and
    (4) if the desired color is within the first color gamut but not within the second color gamut:
        (a) determining the second approximate color in the second color gamut that provides an optimal approximation of the desired color and determining the first approximate color in the first color gamut such that the desired color is between the first approximate color and the second approximate color, and
        (b) modulating the light to adjust brightness and color of the presentation of the respective pixel in the first color gamut to present the first approximate color and to adjust brightness and color of the presentation of the respective pixel in the second color gamut to present the second approximate color, thereby achieving the desired color and either the desired brightness level or an optimum approximation of the desired brightness level for the respective pixel.

EEE14. The method of EEE 5 or 13 that comprises, if the desired color is within the first color gamut and within the second color gamut:
    modulating the light to obtain equal brightness levels of the presentation of the respective pixel in the first color gamut and in the second color gamut if the desired brightness level can be achieved in the first and second color gamuts,
    modulating the light to obtain a maximum brightness level for the presentation of the respective pixel in one of the first and second color gamuts and a brightness level less than the maximum for the presentation in the other one of the first and second color gamuts if the desired brightness level can be achieved, or
    modulating the light to obtain maximum brightness levels for the presentation of the respective pixel in both the first and second color gamuts.

EEE15. The method of EEE 5 or 13 that comprises determining the first approximate color and the second approximate color by:
    establishing the second approximate color at a point in a color space where a first shortest line between the first color gamut and the second color gamut passing through a point in the color space representing the desired color intersects a boundary of the second color gamut if the first shortest line exists;
    establishing the second approximate color at a point in the second color gamut where a second shortest line between the first color gamut and the second color gamut passing through a point in the color space representing a color close to the desired color intersects the boundary of the second color gamut if the first shortest line does not exist, wherein the second shortest line lies on a boundary of an expanded color gamut encompassing the first and second color gamuts; and establishing the first approximate color at a point in the color space either:

at a point in the first color gamut where a second shortest line intersects a boundary of the first color gamut if the first shortest line does not exist, where the first shortest line intersects the boundary of the first color gamut if the first shortest line exists and the desired color is not within the first color gamut, or on the first shortest line on a side of the desired color opposite the second approximate color if the first shortest line exists and the desired color is within the first color gamut.

EEE16. The method of EEE 15, wherein the color close to the desired color is established at a point in the color space where the boundary of the expanded color gamut intersects with an orthogonal line passing through the point representing the desired color.

EEE17. The method of EEE 15, wherein the color close to the desired color is established at a point in the color space where the boundary of the expanded color gamut intersects with a line passing through the point representing the desired color and a white point of either the first color gamut, the second color gamut, or a collective white point of the expanded color gamut.

EEE18. The method of EEE 15 that comprises, if the desired color is not within the first color gamut and is not within the second color gamut, modulating the light to obtain a ratio of brightness levels of the presentation of the respective pixel in the first color gamut and in the second color gamut to achieve a presentation of either the desired color or an optimum approximation of the desired color.

EEE19. The method of EEE 15 that comprises, if the desired color is within the first color gamut but not within the second color gamut:

modulating the light to obtain the presentation of the respective pixel in the first color gamut at a first brightness level and the presentation of the respective pixel in the second color gamut at a second brightness level; wherein:

the first brightness level is equal to one-half the desired brightness level and the second brightness level is equal to one-half the desired brightness level or as high as possible, whichever is less, if a point exists on the first shortest line that can achieve a presentation of the desired color with the presentation of the respective pixel in the first color gamut set at the first brightness level and the presentation of the respective pixel in the second color gamut set at the second brightness level; or the first brightness level and the second brightness level are as high as possible to establish a ratio that achieves a presentation of either the desired color.

EEE20. An apparatus for performing all steps in the method of any one of EEEs 1 through 19.

EEE21. A storage medium recording a program of instructions that is executable by a device to perform all steps in the method of any one of EEEs 1 through 19.

The invention claimed is:

1. A method for processing light to present a color image, the method comprising:

(a) applying a first optical filter having two or more passbands to light in three or more subbands of visible-light spectrum, wherein:
the subbands establish a reference color gamut representing a range of colors, and
each passband in the first optical filter overlaps at least a portion of at least one of the subbands but does not include all wavelengths in all of the three or more subbands;

(b) applying a second optical filter having two or more passbands to light in the three or more subbands, wherein:
the passbands of the first optical filter differ from the passbands of the second optical filter,
the passbands of the first optical filter collectively overlap the passbands of the second optical filter by an amount that exceeds fifty percent, and
each passband in the second optical filter overlaps at least a portion of at least one of the subbands but does not include all wavelengths in all of the three or more subbands;

(c) modulating the light carried in the three or more subbands in response to an input signal to generate modulated color components of the color image in a first color gamut and in a second color gamut, wherein:
the first color gamut differs from the reference color gamut and defines a range of colors capable of being presented by the light in the three or more subbands as filtered by the first optical filter, and
the second color gamut differs from the first color gamut, differs from the reference color gamut and defines a range of colors capable of being presented by the light in the three or more subbands as filtered by the second optical filter; and (d) presenting the modulated color components in the first color gamut and the second color gamut to present the color image with a range of colors in an expanded color gamut that is larger than the reference color gamut.

2. The method as recited in claim 1, further comprising driving three or more light sources to generate light in the three or more subbands, each subband having a respective bandwidth that is less than one-half of an optical band spanned by the three or more subbands.

3. The method as recited in claim 1, further comprising:
driving one or more light sources to generate a source light that has a bandwidth, which spans the three or more subbands; and
splitting the source light into the three or more subbands.

4. The method as recited in claim 1, further comprising presenting intervals of the modulated color components in the first color gamut, alternating with intervals of the modulated color components in the second color gamut.

5. The method as recited in claim 1, further comprising presenting a respective pixel of the color image for a desired color and a desired brightness level, wherein the respective pixel presentation comprises:

(1) determining whether the desired color of the respective pixel is within the first color gamut and within the second color gamut;

(2) if the desired color is within the first color gamut and within the second color gamut, modulating the light to adjust brightness of the presentation of the respective pixel in either or both of the first and second color gamuts, thereby achieving the desired color and either the desired brightness level or an optimum approximation of the desired brightness level for the respective pixel;

(3) if the desired color is not within the first color gamut and is not within the second color gamut:
  (a) determining a first approximate color in the first color gamut that provides an optimal approximation of the desired color, and determining a second approximate color in the second color gamut that provides an optimal approximation of the desired color, and
  (b) modulating the light to adjust brightness and color of the presentation of the respective pixel in the first color gamut to present the first approximate color and to adjust brightness and color of the presentation of the respective pixel in the second color gamut to present the second approximate color, thereby achieving either the desired color or an optimum approximation of the desired color and either the desired brightness level or an optimum approximation of the desired brightness level for the respective pixel; and
(4) if the desired color is within the first color gamut but not within the second color gamut:
  (a) determining the second approximate color in the second color gamut that provides an optimal approximation of the desired color and determining the first approximate color in the first color gamut such that the desired color is between the first approximate color and the second approximate color, and
  (b) modulating the light to adjust brightness and color of the presentation of the respective pixel in the first color gamut to present the first approximate color and to adjust brightness and color of the presentation of the respective pixel in the second color gamut to present the second approximate color, thereby achieving the desired color and either the desired brightness level or an optimum approximation of the desired brightness level for the respective pixel.

6. The method as recited in claim 1, further comprising presenting the modulated color components in the first color gamut simultaneously with the modulated color components in the second color gamut.

7. The method as recited in claim 1, further comprising using an electronically controlled reflective medium to modulate the light in the three or more subbands in response to the input signal.

8. The method as recited in claim 1, further comprising using an electronically controlled transmissive medium to modulate the light in the three or more subbands in response to the input signal.

9. The method as recited in claim 1, further comprising using planes of optical filters in a display device to apply the first and second optical filters to the light in the three or more subbands.

10. The method as recited in claim 1, further comprising:
  using an optical filter wheel that comprises the first optical filter and the second optical filter to apply the first and second optical filters to the light in the three or more subbands;
  using spatial light modulators to modulate the light in the three or more subbands, thereby presenting the color image as a series of pictures arranged in frames, each frame comprising a first subframe picture and a second subframe picture;
  controlling the optical filter wheel such that the first optical filter is applied when the first subframe picture is presented and the second optical filter is applied when the second subframe picture is presented; and
  presenting the modulated color components.

11. The method as recited in claim 10, further comprising using a color-splitting prism to split the light into the three or more subbands.

12. The method as recited in claim 10, further comprising using a color separation filter to split the light into the three or more subbands.

13. A method for presenting a respective pixel of a color image for a desired color and a desired brightness level in an alternating sequence of presentations for a first color gamut and a second color gamut that differs from the first color gamut, wherein the method comprises:
  (1) determining whether the desired color of the respective pixel is within the first color gamut and within the second color gamut;
  (2) if the desired color is within the first color gamut and within the second color gamut, modulating light to adjust brightness of the presentation of the respective pixel in either or both of the first and second color gamuts, thereby achieving the desired color and either the desired brightness level or an optimum approximation of the desired brightness level for the respective pixel;
  (3) if the desired color is not within the first color gamut and is not within the second color gamut:
    (a) determining a first approximate color in the first color gamut that provides an optimal approximation of the desired color, and determining a second approximate color in the second color gamut that provides an optimal approximation of the desired color, and
    (b) modulating the light to adjust brightness and color of the presentation of the respective pixel in the first color gamut to present the first approximate color and to adjust brightness and color of the presentation of the respective pixel in the second color gamut to present the second approximate color, thereby achieving either the desired color or an optimum approximation of the desired color and either the desired brightness level or an optimum approximation of the desired brightness level for the respective pixel; and
  (4) if the desired color is within the first color gamut but not within the second color gamut:
    (a) determining the second approximate color in the second color gamut that provides an optimal approximation of the desired color and determining the first approximate color in the first color gamut such that the desired color is between the first approximate color and the second approximate color, and
    (b) modulating the light to adjust brightness and color of the presentation of the respective pixel in the first color gamut to present the first approximate color and to adjust brightness and color of the presentation of the respective pixel in the second color gamut to present the second approximate color, thereby achieving the desired color and either the desired brightness level or an optimum approximation of the desired brightness level for the respective pixel;
  wherein determining the first approximate color and the second approximate color comprises:
    establishing the second approximate color at a point in a color space where a first shortest line between the first color gamut and the second color gamut passing through a point in the color space representing the desired color intersects a boundary of the second color gamut if the first shortest line exists;
    establishing the second approximate color at a point in the second color gamut where a second shortest line between the first color gamut and the second color gamut passing through a point in the color space representing a color close to the desired color intersects the boundary of the second color gamut if the first shortest line does not exist, wherein the second shortest line lies on a boundary of an expanded color gamut encompassing the first and second color gamuts; and establishing the first approximate color at a point in the color space either:

at a point in the first color gamut where a second shortest line intersects a boundary of the first color gamut if the first shortest line does not exist, where the first shortest line intersects the boundary of the first color gamut if the first shortest line exists and the desired color is not within the first color gamut, or on the first shortest line on a side of the desired color opposite the second approximate color if the first shortest line exists and the desired color is within the first color gamut;

wherein a color that is close to the desired color is established at a point in the color space where the boundary of the expanded color gamut intersects with a line passing through the point representing the desired color and a white point of either the first color gamut, the second color gamut, or a collective white point of the expanded color gamut.

14. The method as recited in claim 13 wherein, if the desired color is within the first color gamut and within the second color gamut, the method further comprises one or more of:

modulating the light to obtain equal brightness levels of the presentation of the respective pixel in the first color gamut and in the second color gamut if the desired brightness level can be achieved in the first and second color gamuts, modulating the light to obtain a maximum brightness level for the presentation of the respective pixel in one of the first and second color gamuts and a brightness level less than the maximum for the presentation in the other one of the first and second color gamuts if the desired brightness level can be achieved, or modulating the light to obtain maximum brightness levels for the presentation of the respective pixel in both the first and second color gamuts.

15. The method as recited in claim 13, wherein the white point of the first color gamut and the white point of the second color gamut are established so that the collective effect of these two white points is equal or nearly equal to the desired white point for the image to be displayed.

16. The method as recited in claim 5 wherein, if the desired color is within the first color gamut and within the second color gamut, the method further comprises one or more of:

modulating the light to obtain equal brightness levels of the presentation of the respective pixel in the first color gamut and in the second color gamut if the desired brightness level can be achieved in the first and second color gamuts, modulating the light to obtain a maximum brightness level for the presentation of the respective pixel in one of the first and second color gamuts and a brightness level less than the maximum for the presentation in the other one of the first and second color gamuts if the desired brightness level can be achieved, or modulating the light to obtain maximum brightness levels for the presentation of the respective pixel in both the first and second color gamuts.

17. The method as recited in claim 5, further comprising determining the first approximate color and the second approximate color by:

establishing the second approximate color at a point in a color space where a first shortest line between the first color gamut and the second color gamut passing through a point in the color space representing the desired color intersects a boundary of the second color gamut if the first shortest line exists;

establishing the second approximate color at a point in the second color gamut where a second shortest line between the first color gamut and the second color gamut passing through a point in the color space representing a color close to the desired color intersects the boundary of the second color gamut if the first shortest line does not exist, wherein the second shortest line lies on a boundary of an expanded color gamut encompassing the first and second color gamuts; and establishing the first approximate color at a point in the color space either:

at a point in the first color gamut where a second shortest line intersects a boundary of the first color gamut if the first shortest line does not exist, where the first shortest line intersects the boundary of the first color gamut if the first shortest line exists and the desired color is not within the first color gamut, or on the first shortest line on a side of the desired color opposite the second approximate color if the first shortest line exists and the desired color is within the first color gamut.

18. The method as recited in claim 16, wherein a color that is close to the desired color is established at a point in the color space where the boundary of the expanded color gamut intersects with an orthogonal line passing through the point representing the desired color.

19. The method as recited in claim 1, wherein the white point of the first color gamut and the white point of the second color gamut are established so that the collective effect of these two white points is equal or nearly equal to the desired white point for the image to be displayed.

20. The method as recited in claim 16, further comprising, if the desired color is not within the first color gamut and is not within the second color gamut, modulating the light to obtain a ratio of brightness levels of the presentation of the respective pixel in the first color gamut and in the second color gamut to achieve a presentation of either the desired color or an optimum approximation of the desired color.

21. The method as recited in claim 16, further comprising, if the desired color is within the first color gamut but not within the second color gamut:

modulating the light to obtain the presentation of the respective pixel in the first color gamut at a first brightness level and the presentation of the respective pixel in the second color gamut at a second brightness level; wherein:

the first brightness level is equal to one-half the desired brightness level and the second brightness level is equal to one-half the desired brightness level or as high as possible, whichever is less, if a point exists on the first shortest line that can achieve a presentation of the desired color with the presentation of the respective pixel in the first color gamut set at the first brightness level and the presentation of the respective pixel in the second color gamut set at the second brightness level; or the first brightness level and the second brightness level are as high as possible to establish a ratio that achieves a presentation of either the desired color.

22. An apparatus for processing light to present a color image, the apparatus comprising:
  (a) means for applying a first optical filter having two or more passbands to light in three or more subbands of visible-light spectrum, wherein:
    the subbands establish a reference color gamut representing a range of colors, and
    each passband in the first optical filter overlaps at least a portion of at least one of the subbands but does not include all wavelengths in all of the three or more subbands;
  (b) means for applying a second optical filter having two or more passbands to light in the three or more subbands, wherein:
    the passbands of the first optical filter differ from the passbands of the second optical filter,
    the passbands of the first optical filter collectively overlap the passbands of the second optical filter by an amount that exceeds fifty percent, and
    each passband in the second optical filter overlaps at least a portion of at least one of the subbands but does not include all wavelengths in all of the three or more subbands;
  (c) means for modulating the light carried in the three or more subbands in response to an input signal to generate modulated color components of the color image in a first color gamut and in a second color gamut, wherein:
    the first color gamut differs from the reference color gamut and defines a range of colors capable of being presented by the light in the three or more subbands as filtered by the first optical filter, and
    the second color gamut differs from the first color gamut, differs from the reference color gamut and defines a range of colors capable of being presented by the light in the three or more subbands as filtered by the second optical filter; and
  (d) means for presenting the modulated color components in the first color gamut and the second color gamut to present the color image with a range of colors in an expanded color gamut that is larger than the reference color gamut.

23. The apparatus as recited in claim 22 wherein the apparatus comprises at least one of a projector, a monitor or a display.

24. An apparatus for presenting a respective pixel of a color image for a desired color and a desired brightness level in an alternating sequence of presentations for a first color gamut and a second color gamut that differs from the first color gamut, wherein the apparatus comprises:
  (1) means for determining whether the desired color of the respective pixel is within the first color gamut and within the second color gamut;
  (2) means for modulating the light, if the desired color is within the first color gamut and within the second color gamut, wherein the light modulating means functions to adjust brightness of the presentation of the respective pixel in either or both of the first and second color gamuts, thereby achieving the desired color and either the desired brightness level or an optimum approximation of the desired brightness level for the respective pixel;
  (3) means for, if the desired color is not within the first color gamut and is not within the second color gamut:
    (a) determining a first approximate color in the first color gamut that provides an optimal approximation of the desired color, and determining a second approximate color in the second color gamut that provides an optimal approximation of the desired color, and
    (b) modulating the light to adjust brightness and color of the presentation of the respective pixel in the first color gamut to present the first approximate color and to adjust brightness and color of the presentation of the respective pixel in the second color gamut to present the second approximate color, thereby achieving either the desired color or an optimum approximation of the desired color and either the desired brightness level or an optimum approximation of the desired brightness level for the respective pixel; and
  (4) means for, if the desired color is within the first color gamut but not within the second color gamut:
    (a) determining the second approximate color in the second color gamut that provides an optimal approximation of the desired color and determining the first approximate color in the first color gamut such that the desired color is between the first approximate color and the second approximate color, and
    (b) modulating the light to adjust brightness and color of the presentation of the respective pixel in the first color gamut to present the first approximate color and to adjust brightness and color of the presentation of the respective pixel in the second color gamut to present the second approximate color, thereby achieving the desired color and either the desired brightness level or an optimum approximation of the desired brightness level for the respective pixel;
  wherein the means to determine the first approximate color and the second approximate color comprises:
    means for establishing the second approximate color at a point in a color space where a first shortest line between the first color gamut and the second color gamut passing through a point in the color space representing the desired color intersects a boundary of the second color gamut if the first shortest line exists;
    means for establishing the second approximate color at a point in the second color gamut where a second shortest line between the first color gamut and the second color gamut passing through a point in the color space representing a color close to the desired color intersects the boundary of the second color gamut if the first shortest line does not exist, wherein the second shortest line lies on a boundary of an expanded color gamut encompassing the first and second color gamuts; and
    means for establishing the first approximate color at a point in the color space either:
      at a point in the first color gamut where a second shortest line intersects a boundary of the first color gamut if the first shortest line does not exist,
      where the first shortest line intersects the boundary of the first color gamut if the first shortest line exists and the desired color is not within the first color gamut, or
      on the first shortest line on a side of the desired color opposite the second approximate color if the first shortest line exists and the desired color is within the first color gamut;
  wherein a color that is close to the desired color is established at a point in the color space where the boundary of the expanded color gamut intersects with a line passing through the point representing the desired color and a white point of either the first color gamut, the second color gamut, or a collective white point of the expanded color gamut.

25. The apparatus as recited in claim 24 wherein the apparatus comprises at least one of a projector, a monitor or a display.

26. A computer readable storage medium comprising a recorded program of instructions that is executable by a device or processor to perform a process for processing light to present a color image, wherein the process comprises:
(a) applying a first optical filter having two or more passbands to light in three or more subbands of visible-light spectrum, wherein:
the subbands establish a reference color gamut representing a range of colors, and
each passband in the first optical filter overlaps at least a portion of at least one of the subbands but does not include all wavelengths in all of the three or more subbands;
(b) applying a second optical filter having two or more passbands to light in the three or more subbands, wherein:
the passbands of the first optical filter differ from the passbands of the second optical filter,
the passbands of the first optical filter collectively overlap the passbands of the second optical filter by an amount that exceeds fifty percent, and
each passband in the second optical filter overlaps at least a portion of at least one of the subbands but does not include all wavelengths in all of the three or more subbands;
(c) modulating the light carried in the three or more subbands in response to an input signal to generate modulated color components of the color image in a first color gamut and in a second color gamut, wherein:
the first color gamut differs from the reference color gamut and defines a range of colors capable of being presented by the light in the three or more subbands as filtered by the first optical filter, and
the second color gamut differs from the first color gamut, differs from the reference color gamut and defines a range of colors capable of being presented by the light in the three or more subbands as filtered by the second optical filter; and
(d) presenting the modulated color components in the first color gamut and the second color gamut to present the color image with a range of colors in an expanded color gamut that is larger than the reference color gamut.

27. A computer readable storage medium comprising a recorded program of instructions that is executable by a device or processor to perform a process for presenting a respective pixel of a color image for a desired color and a desired brightness level in an alternating sequence of presentations for a first color gamut and a second color gamut that differs from the first color gamut, wherein the process comprises:
(1) determining whether the desired color of the respective pixel is within the first color gamut and within the second color gamut;
(2) if the desired color is within the first color gamut and within the second color gamut, modulating the light to adjust brightness of the presentation of the respective pixel in either or both of the first and second color gamuts, thereby achieving the desired color and either the desired brightness level or an optimum approximation of the desired brightness level for the respective pixel;
(3) if the desired color is not within the first color gamut and is not within the second color gamut:
(a) determining a first approximate color in the first color gamut that provides an optimal approximation of the desired color, and determining a second approximate color in the second color gamut that provides an optimal approximation of the desired color, and
(b) modulating the light to adjust brightness and color of the presentation of the respective pixel in the first color gamut to present the first approximate color and to adjust brightness and color of the presentation of the respective pixel in the second color gamut to present the second approximate color, thereby achieving either the desired color or an optimum approximation of the desired color and either the desired brightness level or an optimum approximation of the desired brightness level for the respective pixel; and
(4) if the desired color is within the first color gamut but not within the second color gamut:
(a) determining the second approximate color in the second color gamut that provides an optimal approximation of the desired color and determining the first approximate color in the first color gamut such that the desired color is between the first approximate color and the second approximate color, and
(b) modulating the light to adjust brightness and color of the presentation of the respective pixel in the first color gamut to present the first approximate color and to adjust brightness and color of the presentation of the respective pixel in the second color gamut to present the second approximate color, thereby achieving the desired color and either the desired brightness level or an optimum approximation of the desired brightness level for the respective pixel;
wherein determining the first approximate color and the second approximate color comprises:
establishing the second approximate color at a point in a color space where a first shortest line between the first color gamut and the second color gamut passing through a point in the color space representing the desired color intersects a boundary of the second color gamut if the first shortest line exists;
establishing the second approximate color at a point in the second color gamut where a second shortest line between the first color gamut and the second color gamut passing through a point in the color space representing a color close to the desired color intersects the boundary of the second color gamut if the first shortest line does not exist, wherein the second shortest line lies on a boundary of an expanded color gamut encompassing the first and second color gamuts; and
establishing the first approximate color at a point in the color space either:
at a point in the first color gamut where a second shortest line intersects a boundary of the first color gamut if the first shortest line does not exist,
where the first shortest line intersects the boundary of the first color gamut if the first shortest line exists and the desired color is not within the first color gamut, or
on the first shortest line on a side of the desired color opposite the second approximate color if the first shortest line exists and the desired color is within the first color gamut;
wherein a color that is close to the desired color is established at a point in the color space where the boundary of the expanded color gamut intersects with a line passing through the point representing the desired color and a white point of either the first color gamut, the second color gamut, or a collective white point of the expanded color gamut.

* * * * *